US012381850B2

(12) United States Patent
Chen et al.

(10) Patent No.: US 12,381,850 B2
(45) Date of Patent: *Aug. 5, 2025

(54) VIRTUAL PRIVATE GATEWAY FOR ENCRYPTED COMMUNICATION OVER DEDICATED PHYSICAL LINK

(71) Applicant: Amazon Technologies, Inc., Seattle, WA (US)

(72) Inventors: Po-Chun Chen, Oak Hill, VA (US); Omer Hashmi, Chevy Chase, MD (US); Sanjay Bhal, Germantown, MD (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,575

(22) Filed: Oct. 16, 2023

(65) Prior Publication Data

US 2024/0039895 A1 Feb. 1, 2024

Related U.S. Application Data

(63) Continuation of application No. 16/785,211, filed on Feb. 7, 2020, now Pat. No. 11,831,611, which is a
(Continued)

(51) Int. Cl.
*H04L 9/40* (2022.01)
*H04L 12/46* (2006.01)
(Continued)

(52) U.S. Cl.
CPC ...... *H04L 63/0272* (2013.01); *H04L 12/4633* (2013.01); *H04L 12/66* (2013.01);
(Continued)

(58) Field of Classification Search
CPC . H04L 63/0272; H04L 12/4633; H04L 12/66; H04L 63/0428; H04L 63/18; H04L 67/10
(Continued)

(56) References Cited

U.S. PATENT DOCUMENTS 6,948,003 B1    9/2005   Newman et al.
7,590,074 B1 *   9/2009   Dondeti .............. H04L 12/4675
                                                    370/254
(Continued)

OTHER PUBLICATIONS

Sheila Frankel, et al., "Guide to IPsec VPNs—Recommendations of the National Institute of Standards and Technology", NIST, Dec. 2005, pp. 1-126.
(Continued)

*Primary Examiner* — Moeen Khan
(74) *Attorney, Agent, or Firm* — Alexander A. Knapp; Kowert, Hood, Munyon, Rankin & Goetzel, P.C.

(57) ABSTRACT

A request to establish an encrypted VPN connection between a network and the provider network via a dedicated direct physical link and a set of resources of the provider network is received. An isolated virtual network (IVN) is established to implement an encryption virtual private gateway to be used for the connection. Protocol processing engines (PPEs) are instantiated within the IVN, address information of the PPEs is exchanged with the external network and an encrypted VPN tunnel is configured between the PPEs and the external network. Routing information pertaining to the set of resources is provided to the external network via at least one of the encrypted VPN tunnels, enabling routing of customer data to the set of resources within the provider network from the external network via an encrypted VPN tunnel implemented over a dedicated direct physical link between the external network and the provider network.

20 Claims, 14 Drawing Sheets

Related U.S. Application Data continuation of application No. 15/369,626, filed on Dec. 5, 2016, now Pat. No. 10,560,431.

(51) Int. Cl.
 *H04L 12/66* (2006.01)
 *H04L 67/10* (2022.01)
(52) U.S. Cl.
 CPC .......... *H04L 63/0428* (2013.01); *H04L 63/18* (2013.01); *H04L 67/10* (2013.01)
(58) Field of Classification Search
 USPC ........................................................ 716/153
 See application file for complete search history.

(56) References Cited

U.S. PATENT DOCUMENTS

| | | | |
|---|---|---|---|
| 8,082,581 B2 | 12/2011 | Wu | |
| 8,209,749 B2 | 6/2012 | Babula et al. | |
| 8,261,341 B2 | 9/2012 | Stirbu | |
| 8,443,435 B1* | 5/2013 | Schroeder | H04L 63/08 726/15 |
| 8,543,734 B2 | 9/2013 | McDysan | |
| 8,559,441 B2 | 10/2013 | Miyabe | |
| 8,559,449 B2 | 10/2013 | Rao et al. | |
| 8,612,599 B2 | 12/2013 | Tung et al. | |
| 8,656,420 B2 | 2/2014 | Foster et al. | |
| 8,705,394 B2 | 4/2014 | Venkatachalapathy et al. | |
| 8,953,590 B1* | 2/2015 | Aggarwal | H04L 12/4675 370/409 |
| 9,712,386 B1 | 7/2017 | Chen et al. | |
| 9,954,763 B1 | 4/2018 | Ye et al. | |
| 10,187,289 B1 | 1/2019 | Chen et al. | |
| 10,560,431 B1 | 2/2020 | Chen et al. | |
| 2003/0191841 A1 | 10/2003 | DeFerranti et al. | |
| 2004/0223497 A1 | 11/2004 | Sanderson et al. | |
| 2011/0107413 A1 | 5/2011 | Chawla et al. | |
| 2011/0145836 A1 | 6/2011 | Wheeler et al. | |
| 2011/0153724 A1 | 6/2011 | Raja et al. | |
| 2013/0031424 A1 | 1/2013 | Srivastava et al. | |
| 2013/0227355 A1 | 8/2013 | Dake et al. | |
| 2014/0075048 A1 | 3/2014 | Yuksel et al. | |
| 2015/0089034 A1 | 3/2015 | Stickle et al. | |
| 2015/0134797 A1 | 5/2015 | Theimer et al. | |
| 2015/0163158 A1 | 6/2015 | Ryland | |
| 2015/0163206 A1 | 6/2015 | McCarthy et al. | |
| 2015/0339136 A1* | 11/2015 | Suryanarayanan | G06F 9/455 718/1 |
| 2017/0060420 A1 | 3/2017 | Meyer et al. | |
| 2017/0099159 A1 | 4/2017 | Abraham | |
| 2017/0366586 A1 | 12/2017 | Bloesch et al. | |
| 2020/0252375 A1 | 8/2020 | Chen et al. | |

OTHER PUBLICATIONS

Amazon Web Services, "AWS Direct Connect User Guide API Version", Oct. 22, 2013, pp. 1-42.
Amazon Web Services, "Amazon Virtual Private Cloud: User Guide API Version", Oct. 1, 2013, pp. 1-143.
Amazon Web Services, "AWS re: Invent Deep Dive: AWS Direct Connect and VPNs", Oct. 2015, pp. 1-94.

* cited by examiner

VIRTUAL PRIVATE GATEWAY FOR ENCRYPTED COMMUNICATION OVER DEDICATED PHYSICAL LINK

PRIORITY APPLICATION

This application is a continuation of U.S. patent application Ser. No. 16/785,211, filed Feb. 7, 2020, which is a continuation of U.S. patent application Ser. No. 15/369,626, filed Dec. 5, 2016, now U.S. Pat. No. 10,560,431, which are hereby incorporated by reference herein in their entirety.

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine can be thought of as a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In some cases providers of virtual computing services set up large networks that may logically span several geographical regions or even countries, and may include numerous data centers with varying levels of services and facilities available, utilized together to provide a unified set of services to their end customers.

In some data centers that have been set up to provide virtualized computing and/or storage facilities to external customers, a set of resources at the data center may be dynamically divided into resource pools, with each pool being made available for exclusive use by a given customer for designated periods of time. In one scenario, a virtual isolated network comprising numerous compute instances and/or other devices may be set up for a customer at a provider network, and the customer may be granted substantial networking configuration flexibility for the isolated virtual network. For example, customers may assign IP addresses of their choice within the isolated virtual network, set up subnets and routes, and so on, in a manner very similar to the way that network configuration settings could be selected at a customer-owned facility.

In some data centers that have been set up to provide virtualized computing and/or storage facilities to external customers, requests for access to virtual computing resources may originate from a wide variety of devices—desktop personal computers, laptops, client-office servers, tablets, smart phones and the like. These devices may use either long-lasting network links (e.g., using a client office network with a T1 connection) to communicate with their proximate private network and/or the public Internet, or they may have transient connectivity (e.g., in the case where the customer uses a mobile smart phone). The proximate networks to which the customer devices are directly connected may in turn route request traffic to the provider network's data centers over a wide variety of public paths, such as the public Internet. Such public paths in many cases may have somewhat unpredictable performance, reliability and security characteristics.

Furthermore, some paths between a customer device and a provider network's data center over a public network, such as the Internet, may provide enhanced security, such as encryption. However, encrypted traffic may be decrypted after entering a provider network. The decrypted traffic may then be routed through the provider network to a customer's virtual isolated network within the provider network along with other traffic of other customers of the provider network. Such arrangements involving encrypted paths over public networks and decrypted traffic flow within a provider to a customer's isolated virtual network may not satisfy some customers' requirements for security, network performance, and reliability.

Figure 1:
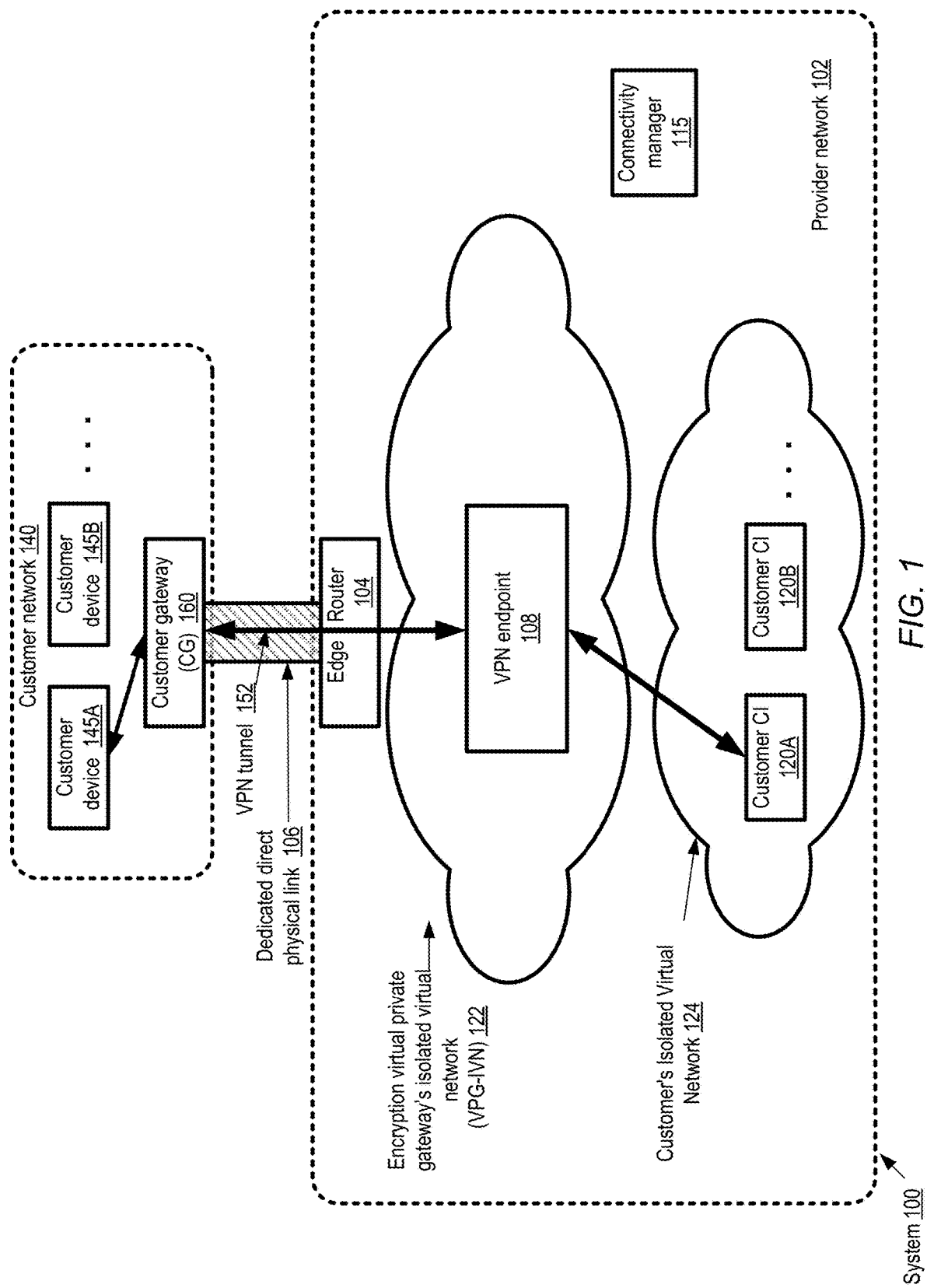
FIG. 1 illustrates an example system environment in which an encryption virtual private gateway (VPG) for connectivity between a customer data center and a customer's isolated virtual network (IVN) within a provider network over a dedicated direct physical link may be established, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing encryption virtual private gateways for encrypted communications over dedicated direct physical network links are described.

According to one embodiment, a system includes a provider network including multiple computing devices configured to implement resource instances of a virtual computing service of the provider network. The provider network also includes an isolated virtual network within the provider network assigned to a customer of the provider network. The isolated virtual network includes one or more of the resource instances of the provider network assigned to the customer of the provider network and included in the customer's isolated virtual network. The provider network also includes an edge router configured to establish a dedicated physical connection between the provider network and a customer endpoint external to the provider network via a dedicated physical network link between the edge router and the external customer endpoint. For example, the edge router of the provider networker may be located at a co-location facility and may be connected to a customer router of a customer's network that is also located at the co-location facility via a cable. In some embodiments, a connectivity intermediary may be connected to a provider network router via a dedicated direct physical link and may allow multiple customers of the provider network to share the dedicated direct physical link to the provider network via logical partitions. The system also includes one or more computing devices, such as computing devices that implement a connectivity manager of the provider network. The one or more computing devices are configured to establish, in response to a request from a customer, an encryption virtual private gateway between the customer's isolated virtual network established within the provider network and the customer's customer endpoint external to the provider network. In order to establish the encryption virtual private gateway, one or more additional resource instances of the provider network (in addition to the one or more resource instances included in the customer's virtual isolated network) are configured to advertise routing information of the one or more additional resource instances to the customer endpoint via the dedicated physical connection. For example, the one or more additional resources instances may be configured to establish a BGP session with the customer endpoint via the dedicated physical connection and exchange addresses information, such as private IP addresses of the one or more resource instances, with the customer endpoint via the BGP session. Subsequent to exchanging routing information, the one or more additional resource instances are further configured to establish one or more encrypted communication tunnels between the customer endpoint and the one or more additional resource instances. Once the one or more encrypted communication tunnels are established, the one or more additional resource instances are further configured to advertise routing information of the one or more resource instances included in the customer's isolated virtual network to the customer endpoint via the one or more encrypted communication tunnels. Subsequent to exchanging routing information via the one or more encrypted communication tunnels, the one or more additional resource instances are configured to enable encrypted communication between the one or more resource instances included in the customer's isolated virtual network and the customer endpoint external to the provider network via the one or more encrypted communication tunnels implemented over the dedicated physical connection.

In one embodiment, a method of establishing an encryption virtual gateway for an isolated virtual network within a provider network includes advertising routing information of one or more resource instances of the provider network external to the isolated virtual network to an endpoint external to the provider network via a dedicated physical network link established between an edge router of the provider network and the external endpoint, establishing one or more encrypted communication tunnels between the external endpoint and the one or more resource instances of the provider network external to the isolated virtual network, advertising routing information of one or more resource instances included in the isolated virtual network to the external endpoint via the one or more encrypted communication tunnels, and enabling encrypted communication to flow between the one or more resource instances included in the isolated virtual network and the external endpoint via the one or more encrypted communication tunnels implemented via the dedicated physical network link.

In one embodiment, a non-transitory computer-accessible storage medium stores program instructions that, when executed, cause one or more processors to, in response to a request to establish an encryption virtual private gateway for an isolated virtual network within a provider network: advertise routing information of one or more resource instances of the provider network external to the isolated virtual network to an endpoint external to the provider network via a dedicated physical network link between an edge router of the provider network and the external endpoint; establish one or more encrypted communication tunnels between the external endpoint and the one or more resource instances of the provider network external to the isolated virtual network; advertise routing information of one or more resource instances included in the isolated virtual network to the external endpoint via the one or more encrypted communication tunnels; and enable encrypted communication between the one or more resource instances included in the isolated virtual network and the external endpoint via the one or more encrypted communication tunnels implemented via the dedicated physical network link.

Networks set up by an entity such as a company or a public sector organization to provide one or more network-accessible services (such as various types of cloud-based computing or storage services) accessible via the Internet and/or other network paths, such as a dedicated physical link, to a distributed set of clients may be termed provider networks herein. Resources of some of the services may be used for supporting other services: for example, as described in detail below, gateways that enable encrypted VPN connectivity over a dedicated direct physical link between a customer's external data centers and provider network resources allocated to the customer may be established using compute instances of a virtual computing service. The compute instances may, for example, be hosted on commodity hosts, and the resulting gateways may thus be much less expensive to implement than gateways that rely on special-purpose proprietary networking devices. Furthermore, the compute instances may be located in the provider network proximate to a customer's isolated virtual network within the provider network, such that routing of decrypted traffic that has been decrypted at the resource instances through the provider's network is minimal. In at least some embodiments, several administrative or "control-plane" services may be established within the provider network to enable the desired levels of scalability, availability and/or fault-resilience for the encrypted VPN functionality. For example, a multi-layer health monitoring service that is capable of analyzing collected health status information in several phases to initiate both short-term and long-term corrective actions for potential failures may be established in some embodiments. In some embodiments, a connectivity manager may further be configured to coordinate configuration of a dedicated direct physical link between a customer data center and an edge router of a provider network prior to establishing an encryption virtual gateway for encrypted VPN communications between an isolated virtual network of the customer within the provider network and the customer's data center external to the provider network.

In many cases virtualization technologies may be used to implement components of various provider network services. For example, a single computing device may be used to instantiate multiple virtual machines of a computing service, which may be referred to as "resource instances" (or simply "instances") herein, with the computing device being referred to as an "instance host". The virtual machines may serve as execution platforms for a variety of applications and service components, including, for example, protocol processing engines (PPEs) used to implement encryption virtual private gateways as described below. An instance host may be utilized in either a single-tenant mode or a multi-tenant mode in different embodiments. In single-tenant mode, for example, a compute instance may be launched at the instance host on behalf of only a single customer, and as a result the resources of the instance host (e.g., processors, memory, storage and the like) may not be shared with other customers. In a multi-tenant environment, resource instances may be launched on behalf of several customers at the same instance host, without the customers necessarily being informed that the same host that is being used for their workload is also being used for other customers. Such transparent resource sharing may enable more effective use of the hardware resources of the provider network (e.g., typically, a higher average utilization level may be achieved in multi-tenant mode than in single-tenant mode). As described below, protocol processing engines used for encryption virtual private gateways may be implemented at instance hosts using either single-tenant mode or multi-tenant mode in different embodiments. As the likelihood of security breaches may be considered somewhat lower when only a single customer's traffic is flowing through an instance host than when multiple customer workloads are handled at a given instance host, single-tenant mode may be used for encryption virtual private gateway PPEs in some implementations despite the possibility of lower overall resource utilization levels.

In at least some embodiments, a provider network may enable customers to set up "isolated virtual networks" (IVNs) at the provider's data centers. An IVN (which may also be referred to in some environments as a virtual private cloud or VPC) may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources, manage the creation of subnets within the IVN, and the configuration of route tables etc. for the IVN. For at least some of the devices within an IVN in some embodiments, the network addresses may not be visible outside the IVN, at least by default. In addition to enabling customers to set up logically isolated networks for their applications, IVNs may also be used by the provider network itself to support various features such as encrypted tunnel connectivity in some embodiments. In order to enable connectivity between a customer's IVN and the customer's external endpoints (e.g., devices at the customer's data center or office premises), an encryption virtual private gateway (VPG) may be set up in one embodiment using a dedicated IVN whose network configuration settings are selected by administrative components of a connectivity service of the provider network, rather than by an external customer. Such a dedicated IVN used primarily or entirely for implementing an encryption virtual private gateway may be referred to as a VPG-IVN to distinguish it from IVNs set up for implementing customer applications. The encryption virtual private gateway may serve as a network concentrator on the provider network side of the path between a customer's data center and the customer's IVN within the provider network. In addition, one or more virtual network interfaces may be included in the encryption virtual private gateway to enable communications between the resource instances included in the VPG-IVN, such as protocol processing engines, and customer endpoints external to the provider network that are connected to an edge router of the provider network via a dedicated direct physical link. In some embodiments one or more VPN (virtual private network) connections may be configured between a customer's IVN and external networks (such as the customer's office network or the customer's data centers) using protocol processing engines (PPEs) instantiated at compute instances within the VPG-IVN and a dedicated direct physical link between an edge router of the provider network and the customer's data center. A variety of different protocols may be used for connections between the customer IVNs and the external networks in different implementations—e.g., IPSec (Internet Protocol Security), SSL/TLS (Secure Sockets Layer/Transport Layer Security), DTLS (Datagram Transport Layer Security) and the like.

According to one embodiment, a set of programmatic interfaces (e.g., APIs, web pages, custom graphical user interfaces, command-line tools or the like) may be implemented by the provider network to enable customers to utilize encrypted VPN-related features of a connectivity service of the provider network. A request via such a programmatic interface may be received, e.g., at a connectivity manager component of the provider network's connectivity service, to establish an encrypted VPN connection between (a) a customer data center of a particular customer C1 and (b) C1's IVN within the provider network over a dedicated direct physical link between the customer's data center and the provider network. The connectivity manager may determine whether a compute instance-based encryption virtual private gateway (VPG) has previously been set up on behalf of C1. If no such pre-existing encryption VPG is found, a new IVN may be configured for an encryption VPG to be established for the customer. The internal configuration of this special-purpose IVN (which, as mentioned earlier, may be referred to as a VPG-IVN) may be controlled by the connectivity manager (in contrast to C1's IVN, for which networking configuration choices may be made by C1). In some embodiments, the connectivity manager itself may comprise a plurality of physical and/or logical components that may be distributed across multiple data centers of the provider network.

In at least some embodiments, a plurality of compute instances may be launched within the VPG-IVN at the request of the connectivity manager, e.g., at respective instance hosts used in single-tenant mode. For example, the connectivity manager may transmit instance launch requests specifying various characteristics of the instances required (e.g., the instance types or performance capabilities, as discussed below in further detail) to the virtual computing service using the virtual computing service's API. At least a pair of protocol processing engines (PPEs) (e.g., each comprising one or more processes at a compute instance) may be configured at respective compute instances of the VPG-IVN in one implementation.

In addition, the set of programmatic interfaces (e.g., APIs, web pages, custom graphical user interfaces, command-line tools or the like) may allow a virtual network interface for communication between an encryption VPG-IVN and external customer endpoints connected to the provider network via a particular dedicated direct physical link between the provider network and the external customer endpoints to be specified. For example, the set of programmatic interfaces may allow specification of a virtual network interface to be established for a dedicated direct physical link from a provider network to a customer data center. In some embodiments, a request to establish a virtual network interface for a dedicated direct physical link may be included in a request to establish an encrypted VPN connection or may be included in a separate request related to an encrypted VPN connection. In some embodiments, more than one virtual network interface for more than one dedicated direct physical link may be specified to be established for a particular encryption VPG-IVN.

Network address information of resource instances included in an encryption VPG-IVN and the external endpoints connected to the provider network via a dedicated direct physical link may be exchanged via a virtual network interface. For example, a protocol processing engine (PPE) implemented on a resource instance may exchange private IP address information of the resource instance with external customer endpoints connected to the dedicated direct physical link using the virtual network interface. Also, a protocol processing engine (PPE) implemented on a resource instance may receive address information for customer endpoints connected to a dedicated direct physical link using a virtual network interface for the dedicated direct physical link attached to an encryption VPG-IVN that includes the PPE implemented on the resource instance. In some embodiments, a protocol processing engine (PPE) may include a border gateway protocol (BGP) processing module configured to transmit routing information between the protocol processing engine and external endpoints connected to the provider network via a dedicated direct physical link. In some embodiments, a virtual network interface may utilize VLAN tagging, private IP addresses, MPLS tagging, etc. to enable communication between a resource instance implementing a protocol processing engine of an encryption VPG-IVN and external customer endpoints.

Once address information is transmitted between external customer endpoints connected to a provider network via a dedicated direct physical link and resource instances of an encryption VPG-IVN, establishment of respective encrypted VPN tunnels may then be initiated between protocol processing engines (PPEs) implemented on the resource instances and the external endpoints. For example, in one implementation, the customer may invoke the equivalent of a "CreateVPNConnection" API followed by a "DescribeVPNConnection" API, and the response to the DesrcibeVPNConnection API may include configuration settings to be applied at the customer's endpoint to establish the encrypted tunnels. In such an implementation, the configuration information for the customer endpoint may include addresses of two VPN head-ends within the provider network, e.g., one at each protocol processing engine (PPE) of a pair. In embodiments in which IPSec is to be used for the encrypted VPN, the configuration may also contain a pre-shared secret key. The key may be used, in accordance with the IKE (Internet Key Exchange) protocol to set up a security association (SA) for each tunnel. In some embodiments, an IKE SA may remain valid for some number of hours (e.g., eight hours), and may in turn be used to establish an IPSec SA, which may have its own validity period (e.g., one hour). The IPSec SA may then be used to encrypt data traffic over the VPN connection.

Once encrypted VPN tunnels are established between protocol processing engines (PPEs) implemented on resource instances of an encryption VPG-IVN of a provider network and external endpoints connected to the provider network via a dedicated direct physical link, private network routing information for resource instances in a customer's isolated virtual network (IVN) may be shared with the external endpoints via the encrypted tunnels. Because the private network routing information, for example private IP addresses, of the resource instances of the customer's IVN are shared over encrypted VPN tunnels the private IP addresses are not accessible to any other customer that may share the dedicated direct physical link with the particular customer.

In some embodiments, at a given point in time, one protocol processing engine (PPE) of the plurality of PPEs may be considered the primary or active PPE, and its encrypted VPN tunnel may be considered the primary pathway of the encrypted VPN connection, while at least one of the other PPEs and its encrypted tunnel may be considered secondary or standby resources. As described below, in response to a determination that a failure may have occurred at the primary PPE (e.g., that a probability of a failure at the primary PPE is above a threshold), a health monitoring service of the provider network may rapidly initiate a transition of the secondary PPE to a primary role in some embodiments. In at least some embodiments, a routing service of the provider network may be responsible for initially designating one of the PPEs as the primary or active PPE and another as the secondary or passive PPE.

In order for packets to flow between external endpoints, such as specific customer devices in customer 1's (C1's) data center and various resources within C1's isolated virtual network (IVN), routing information may have to be exchanged for both ends of the VPN connection in at least some embodiments. In one embodiment, for example, a customer gateway may establish a respective BGP (Border Gateway Protocol) session within respective encrypted tunnels to each of two PPEs. Customer-side routing information may be provided to the PPEs using these BGP sessions. Within the provider network, in at least some embodiments, a centralized routing service may be implemented as described below. The PPEs may send the received customer-side routing information to the routing service, e.g., via an HTTPS (HyperText Transfer Protocol Secure) based or HTTP (HyperText Transfer Protocol) based internal routing information exchange API implemented by the routing service. The customer-side routing information may be stored within a persistent repository of the routing service, which may also include internal routing information pertaining to provider network resources (such as route settings of C1's IVN).

In at least one embodiment, the provider network may support the use of "virtual network interfaces" (VNIs), such as a virtual network interface for a dedicated direct physical link, described above, that can be dynamically attached to or detached from a compute instance. Such VNIs may also be referred to as "elastic network interfaces" in some environments. A VNI may have a set of attributes, including for example at least one private IP address (e.g., an address that is not visible outside the provider network), security settings, a MAC address, source/destination check flag settings, and the like, that can be transferred from one instance to another by programmatically detaching the VNI from the first instance and programmatically attaching it to the other instance. In some embodiments, one VNI may be created and attached to a compute instance at which a PPE is implemented for traffic to or from a customer data center, while a second VNI may be created and attached to the compute instance for traffic between the compute instance and a customer's IVN with in a provider network. The second VNI may, for example, be configured with an IP address that belongs to a range of addresses set up for the customer's IVN.

In some embodiments, the virtual computing service of the provider network may support a variety of compute instance categories, e.g., "small", "medium" and "large" compute instances that differ from each other in relative computing power, memory, storage space, network bandwidth and the like. Since the amount of traffic being handled via a particular encrypted VPN connection may vary from one customer to another, and may also vary for the same customer over time, the instance category that is best suited for a given encryption VPG may also differ from one customer to another and/or from one time period to another. Based on monitoring the traffic associated with a particular encrypted VPN connection or set of encrypted VPN connections, a decision may be made (e.g., by a connectivity manager or a health monitoring service) to transition to the use of a different instance type for a customer's encryption VPG. One PPE of the PPE pair set up for a particular encrypted VPN connection may be transitioned (e.g., either dynamically, or as part of a maintenance window) to a different instance type while the other PPE is configured as the primary, for example, and then the same types of transition may be accomplished for the second PPE of the pair. In some embodiments, depending on the amount of encrypted VPN traffic, multiple PPEs corresponding to different encrypted VPN connections may be hosted at the same instance. In one implementation, a single PPE may be used for multiple encrypted VPN connections. In some embodiments, the provider network may allow customers to choose from among a variety of availability levels or availability policies for their encrypted VPN connections. If a customer indicates a preference for a low-availability (and potentially lower-price) encrypted VPN connection, a single PPE rather than a pair of PPEs may be set up for such a connection in some embodiments.

As mentioned earlier, a health monitoring service (HMS) may be implemented at a provider network in some embodiments, e.g., to ensure that potential problems with encrypted VPN connectivity (as well as other types of provider network services) are dealt with promptly and effectively. In at least one embodiment, front-end nodes of the HMS may collect health status metrics for monitored resources using a variety of techniques, and store the collected information in a persistent repository of the HMS for analysis by back-end decision nodes of the HMS. For example, any combination of the following types of information may be obtained with respect to encrypted VPNs implemented using the kinds of techniques described above: respective self-health-check metrics from sub-components of the PPEs (e.g., an IPSec processing module of a PPE may provide results of internal tests to the HMS), responses to programmatic status queries supported by a virtual computing service being used for PPEs, peer health status reports from a peer group of PPEs (e.g., other PPEs within the VPG-IVN), and/or protocol verification metrics obtained using at least one network pathway established to emulate interactions of the PPEs with the customer data center. At least two stages or modes of analysis may be performed on the health metrics data collected over a particular time period in some embodiments. In a first phase, a relatively rapid analysis may be undertaken (e.g., using a few selected key metrics) that determines whether the probability of a failure at a monitored resource is above a first threshold. If the probability is above the threshold, a rapid-response mitigation action may be undertaken, e.g., by making configuration changes that have the effect of replacing the primary PPE with its corresponding secondary. In some scenarios, a first analysis that results in such a mitigation action may then be followed by a more detailed secondary analysis, e.g., to determine whether additional longer-term remedial actions should to be taken. If the resource whose failure probability exceeded the threshold is found to be experiencing longer term problems, or the probability of failure determined using the detailed analysis increases even further, for example, the problematic resource may be taken offline and replaced by a new resource (e.g., a new instance and/or a new instance host) in some embodiments. Thus, by examining health metrics collected from a variety of sources, and by performing several different analyses at respective levels of detail, resource health status may be determined with a higher degree of soundness and completeness than may be possible using some conventional health monitoring techniques.

Example System Environment

FIG. 1 illustrates an example system environment in which an encryption virtual private gateway (VPG) for connectivity between a customer data center and a customer's isolated virtual network (IVN) within a provider network over a dedicated direct physical link may be established, according to some embodiments. As shown, system 100 comprises a provider network 102 that includes a plurality of resources which may be used to implement a variety of network-accessible multi-tenant and/or single-tenant services. A virtual computing service of the provider network 102 may implement programmatic interfaces (e.g., APIs, web pages, command-line tools or the like) that enable customers to request allocation of virtualized compute servers called compute instances. In the depicted embodiment, the virtual computing service may also enable customers to request the establishment of isolated virtual networks (IVNs), such as C-IVN 124, within which at least some of the customer's instances may be launched. As described above, a customer IVN may comprise a plurality of resources placed within a logically-isolated portion of the provider network, over which the customer is granted substantial administrative control with respect to various aspects of network configuration, such as the assignment of IP addresses to various devices, the establishment of subnets, and so on. At least some of the IP addresses assigned to IVN resources, such as customer CIs (compute instances) 120A and 120B may be "private", e.g., the addresses may not be accessible from or advertised on the public Internet or from other customers' IVNs within the provider network. IVN functionality may in effect allow customers to dynamically increase or decrease the number of computing and/or storage resources that can be deployed for various applications, while maintaining a level of network isolation and security that is close to (or better than) the corresponding levels of isolation and security achievable at the customer's own data centers.

As shown, a provider network, such as provider network 102, may include an edge router configured to establish a dedicated direct physical connection with endpoints external to the provider network. For example, provider network 102 includes edge router 104 configured to establish a dedicated direct physical connection with customer gateway 160 of customer network 140 via dedicated direct physical link 106. In some embodiments, a dedicated direct physical link may be a private link or set of links that is not accessible by the general public. For example, dedicated direct physical link 106 may be a physical cable or set of cables controlled by a customer associated with customer network 140. In some embodiments, a third party connectivity intermediary may allow a limited number of customers to share a dedicated direct physical link via partitioning of the dedicated direct physical link. For example, a connectivity intermediary may control a dedicated direct physical link or set of links from a provider network to a remote location and customers of the provider network may utilize partitions of the connectivity intermediary's dedicated direct physical link to connect to the provider network from the remote location.

At least for certain types of applications, customers may wish to establish secure encrypted communication channels (e.g., using any appropriate VPN (Virtual Private Network) protocol) between their external data centers and their IVNs. For example, in the depicted scenario, secure connectivity may be needed between customer device 145A at customer data center (C-DC) 140, and customer CI 120A at C-IVN 124. In general, the customer may want to allow network traffic from any customer device 145 (e.g., 145A, 145B, etc.) at C-DC 140 to flow securely to any customer CI 120 within C-IVN 124 via dedicated direct physical link 106, and from any customer CI 120 within C-IVN 124 to any customer device 145 within C-DC 140 via dedicated direct physical link 106. A connectivity service of the provider network, which may include one or more computing devices that implement administrative components referred to collectively herein as a connectivity manager 115, may implement a set of programmatic interfaces to support encrypted VPNs and/or other forms of secure communications between customer resources and provider network resources in the depicted embodiment.

Using a programmatic interface of the connectivity manager 115, a customer may request establishment of an encrypted VPN connection between C-DC 140 and C-IVN 124 via dedicated direct physical link 106. If an encryption virtual private gateway does not already exist for the specified network pair (i.e., the C-IVN and the customer data center network), an encryption virtual private gateway (VPG) may be configured for the requested VPN connection. A dedicated IVN 122 may be established by the connectivity manager 115 for the connectivity needs of customer C, and one or more PPEs (protocol processing engines) may be started up on compute instances within the IVN to implement the encryption VPG. Unlike C-IVN, whose networking configuration is (at least largely) controlled by the customer, the configuration of the IVN to be used for the encryption VPG may be controlled by the connectivity manager 115. This second IVN may be referred to as a "VPG-IVN", to distinguish it from C-IVN within which the customer CIs are implemented. In the depicted embodiment, VPG-IVN 122's instances may be used entirely for connectivity purposes; thus, customer application code may typically not be executed within VPG-IVN 122. The number of PPEs that are established for a given VPN connection, and the mappings between PPEs and VPG-IVN compute instances and hosts, may differ in various embodiments.

An encrypted VPN tunnel (e.g., 152) may be established between each PPE of an encryption VPG-IVN and a customer gateway (CG) 160 of the customer's data center. The establishment of such a tunnel 152 may involve the transmission of a set of configuration information from the connectivity manager 115 to the customer data center or from a PPE implemented in the VPG-IPN, for example from VPN endpoint 108, where one or more settings indicated in the configuration information may be applied to the customer gateway (CG) 160. In one implementation, for example, to initiate the encrypted VPN connection, a client process or thread at C-DC 140 may issue a "CreateVPN-Connection" request programmatically. In response, a new object representing a yet-to-be-fully-configured VPN connection may be generated by the connectivity manager 115, and an identifier of the connection may be provided to the client. The client may then submit a "DescribeVPNConnection" request with the identifier as a parameter, and receive a set of configuration information and/or instructions. The instructions may include, for example, an IP addresses of the PPEs which are designated as VPN endpoints, such as VPN endpoint 108 within the provider network. In embodiments in which IPSec is to be used for the encrypted VPN, a secret key may also be provided in the DescribeVPNConnection response (or in response to an invocation of a different API). The key may be used in accordance with the IKE (Internet Key Exchange) protocol to set up a security association (SA) for a tunnel 152 to be established between the customer gateway 160 and the VPN endpoint 108. In some embodiments, the IKE SA may then be used to establish an IPSec SA, and the IPSec SA may be used to encrypt subsequent data traffic over the VPN tunnels.

In the depicted embodiment, routing information pertaining to C-IVN's resources (e.g., various compute instances 120) may be provided to the customer gateway 160 via a PPE implemented on a compute instance comprising VPN endpoint 108. Similarly, routing information pertaining to the customer data center (e.g., routing changes with respect to various customer devices 145) may be provided to at a PPE implemented on VPN endpoint 108 from the customer gateway 160. The PPE may receive and respond to routing-related messages formatted according to any of various routing protocols in various embodiments, including for example session-oriented protocols such as BGP, as well as internal protocols such as an HTTPS-based protocol that may be supported within the provider network by a routing service as described below. The PPEs may in some embodiments act as translators of routing information—e.g., receiving BGP-based information from the customer data center, transmitting the received information over HTTP or HTTPS to the routing service within the provider network, and performing the reverse type of translation in the opposite direction for routing information originating at the routing service.

Example Method of Establishing an Encryption Virtual Private Gateway

FIGS. 2A-E illustrate an example system environment in which an encryption virtual private gateway (VPG) for traffic over a dedicated direct physical link is being established in response to a request, according to some embodiments. FIGS. 2A-2E illustrate a system 100 that includes a provider network 102 and dedicated direct physical link 106, that may be the same as illustrated in FIG. 1.

In some embodiments, a customer may request an encryption virtual private gateway be established by submitting a request that is routed to a connectivity manager of a provider network, such as connectivity manager 115. In some embodiments, the request may originate external to the provider network, such as request 200, or may originate within the provider network, such as request 202 from one the customer's compute instances 120 in the customer's C-IVN 124. In response to receiving a valid request, a connectivity manager may cause compute instances to be launched in a separate isolated virtual network within a provider network. Furthermore, the connectivity manager may cause the launched compute instances to be spun up as protocol processing engines. For example, in response to request 200 or 202, connectivity manager 115 may cause protocol processing engines 210A and 210B to be launched in VPG-IVN 122. Furthermore, in response to a request for a virtual interface for a particular dedicated direct physical link being included in the encryption VPG request or in a separate request, the connectivity manager may cause virtual network interfaces, such as virtual network interfaces 212A and 212B to be attached to protocol processing engines 210A and 210B. In some embodiments, virtual network interfaces 212A and 212B may include address information, such as private IP addresses, for routing traffic to the virtual network interfaces 212A and 212B. In addition, virtual interfaces 212A and 212B may be configured to perform networking tagging such as VLAN tagging, MPLS, tagging, etc. to allow network address information and traffic to be exchanged between protocol processing engines 210A and 210B and customer gateway 160.

In addition, a connectivity manager, such as connectivity manager 115, may cause virtual network interfaces 214A and 214B to be attached to protocol processing engines 210A and 210B to enable traffic to be routed within the provider network between the customer's C-IVN 124 and protocol processing engines 210A and 210B.

Figure 2A:
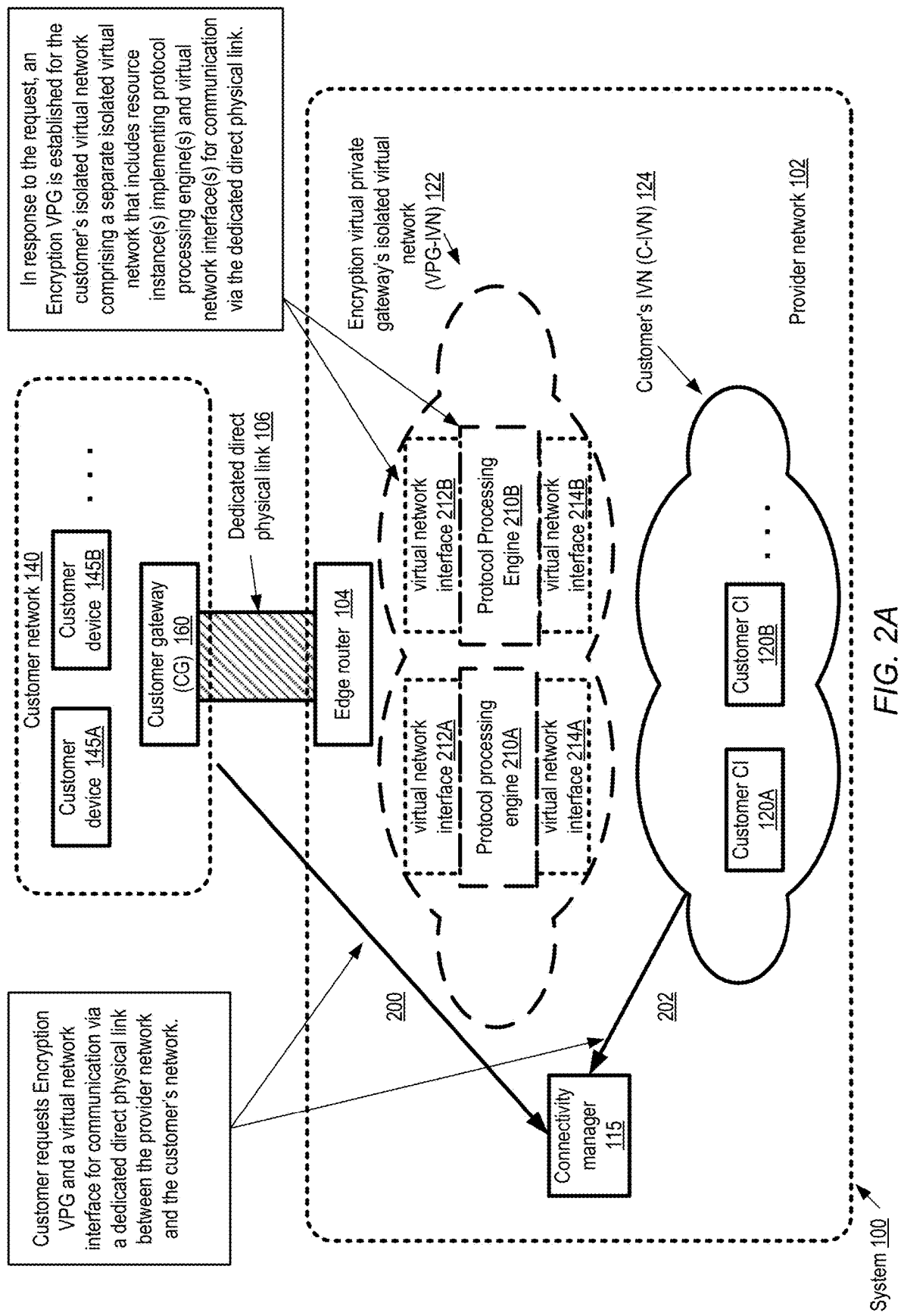
FIGS. 2A-E illustrate an example system environment in which an encryption virtual private gateway (VPG) for traffic over a dedicated direct physical link is being established in response to a request, according to some embodiments.
Figure 2B:
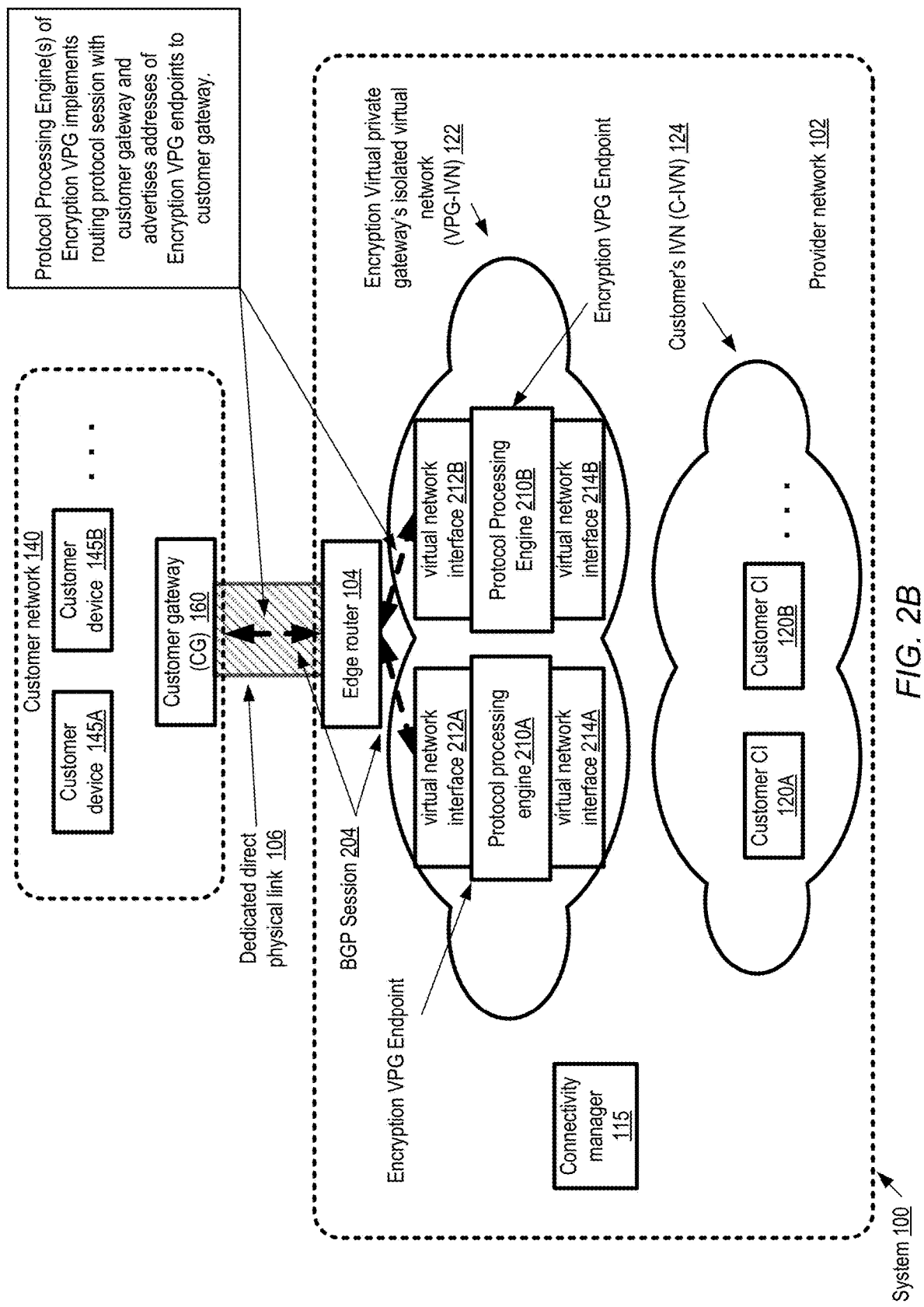

FIG. 2B illustrated a routing protocol session being implemented between resource instances included in a VPG-IVN, according some embodiments. Once protocol processing engines 210A and 210B along with virtual interfaces 212A and 212B are established, a routing protocol session, such as BGP session 204, may be implemented between protocol processing engines 210A and 210B and customer gateway 160 via edge router 104 and dedicated direct physical link 106. Address information for endpoints within customer network 140 and address information for protocol processing engines 210A and 210B within VPG-IVN 122 within provider network 102 may be exchanged. In some embodiments, address information for processing engines 210A and 210B may comprise private address information that is not routable over the public Internet.

Figure 2C:
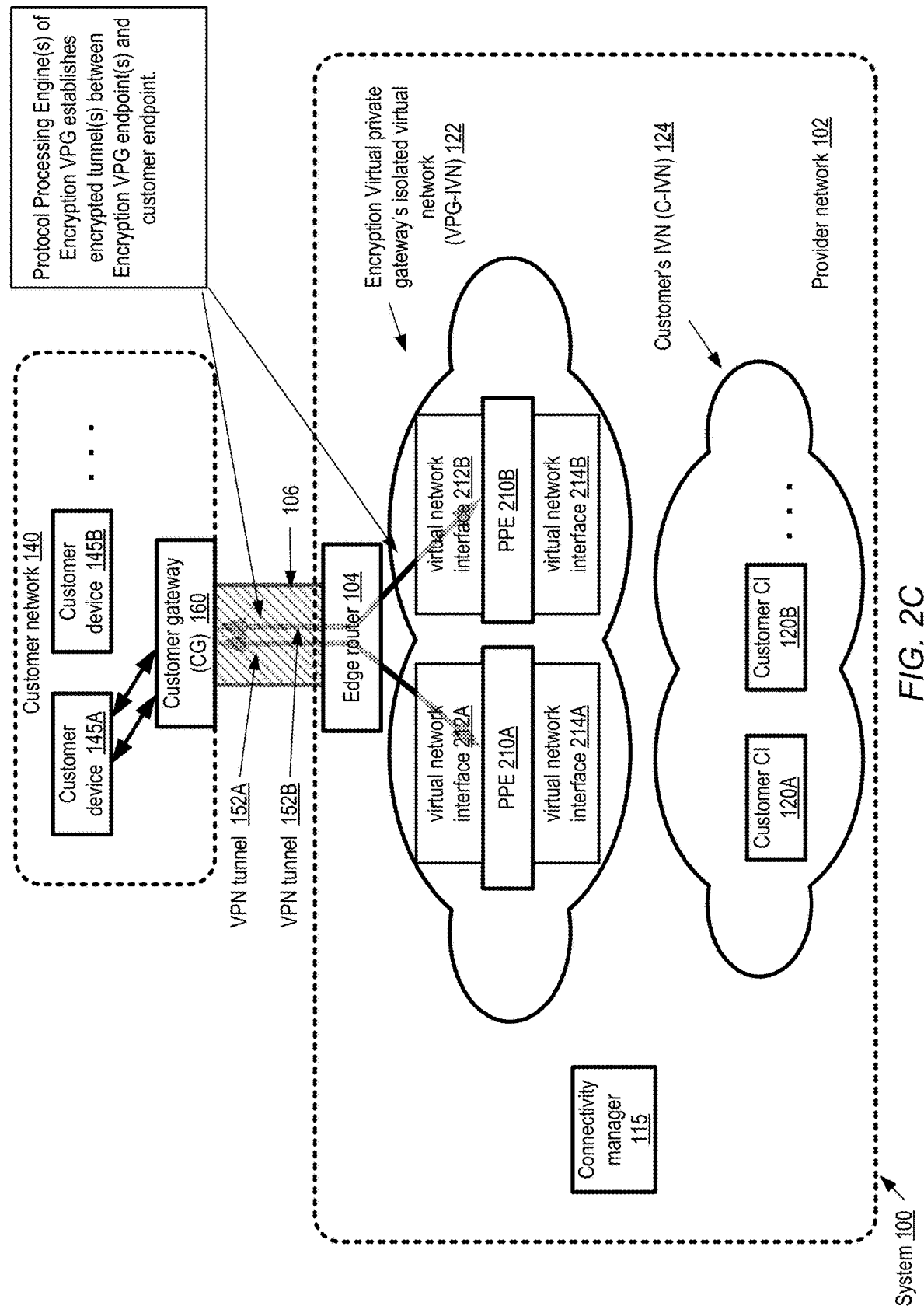

FIG. 2C illustrates encrypted communication tunnels being established between protocol processing engines and an endpoint external to a provider network via a dedicated direct physical link, according to some embodiments. Once routing information has been exchanged between protocol processing engines 210A and 210B and customer gateway 160, encrypted communication tunnels may be established between PPE 110A and 110B and a customer endpoint, such as an endpoint at customer device 145A or at customer gateway 160. In some embodiments, a single logical VPN connection between a customer data center and the customer's IVN may comprise two separate encrypted tunnels 152A and 152B. The term "dual-tunnel VPN connection" may be used herein to refer to the combination of two tunnels such as 152A and 152B configured for a single logical VPN connection. One of the tunnels (e.g., 152A) may be configured as the primary tunnel of the VPN connection (e.g., using the appropriate routing settings) in some embodiments.

Figure 2D:
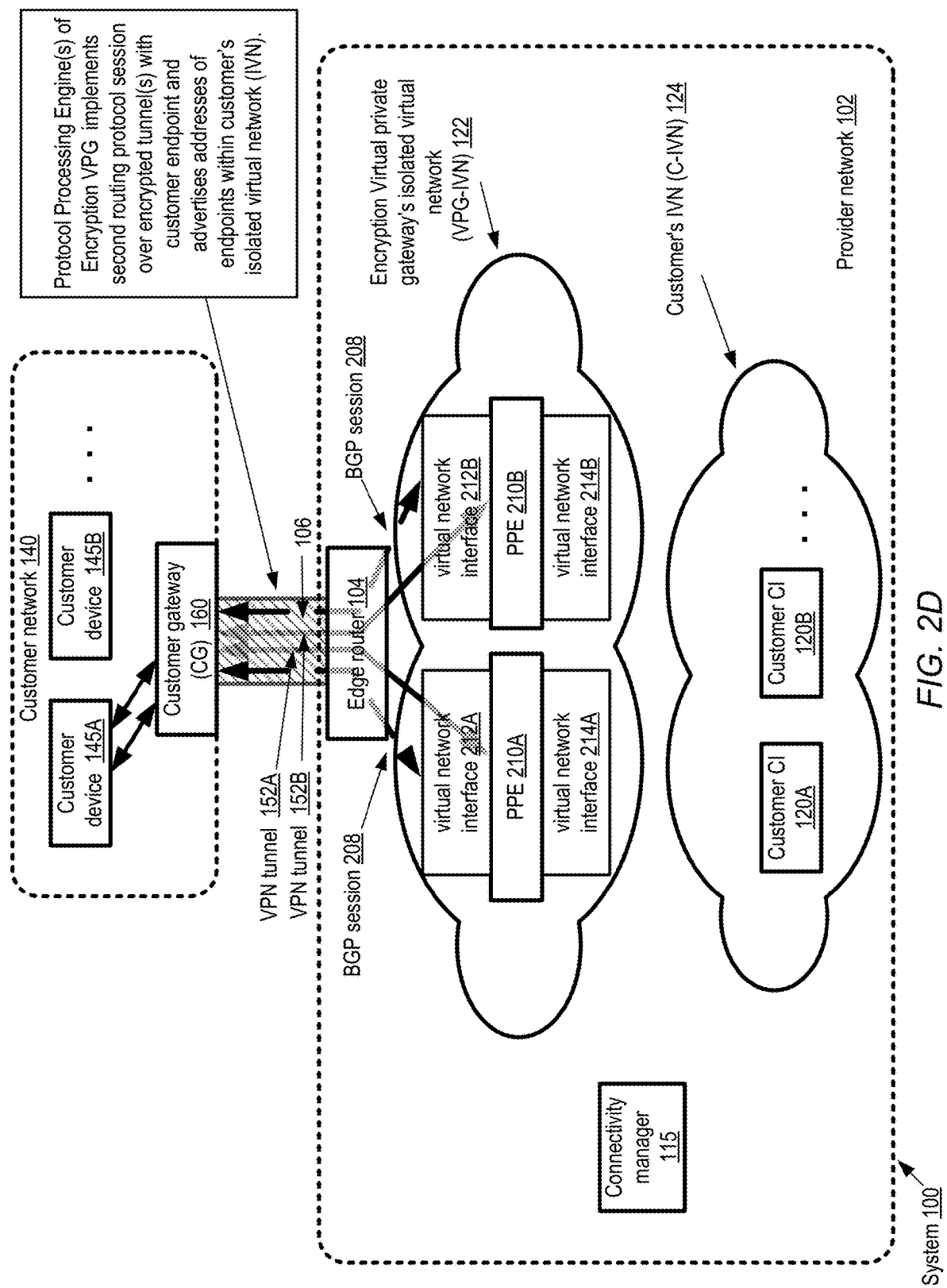
Figure 2E:
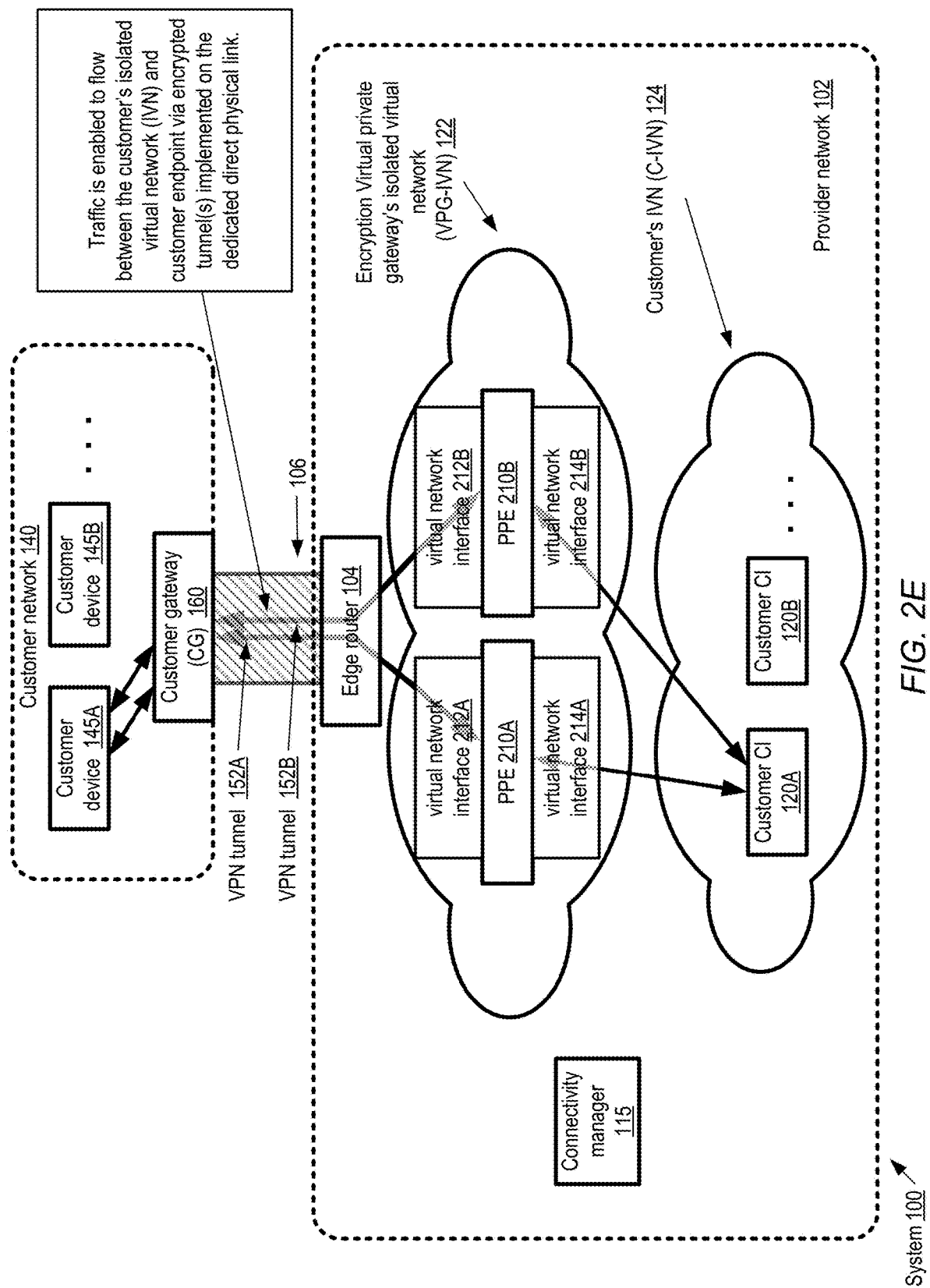

FIG. 2D illustrates a second BGP session established within encrypted communication tunnels established between protocol processing engines and an endpoint external to a provider network via a dedicated direct physical link. Once encrypted VPN tunnels 152A and 152B are established, protocol processing engines 210A and 210B may then establish a second routing protocol session, such as BGP session 208, within the encrypted VPN tunnels 152A and 152B to advertise routing information for endpoints within a customer's isolated virtual network, such as private address information for customer instances 120A and 120B in C-IVN 124. Because the customer's private IP address are advertised via a routing protocol session within encrypted communication tunnels, the customer's private IP address are not exposed to any third party other than the customer's endpoints, such as customer gateway 160 and/or customer devices 145A and 145B. This is contrast to dedicated direct physical link communications that do not use encrypted communication tunnels. In such arrangements, private IP address of customer instances in a customer's isolated virtual network may be intercepted while being transmitted between a provider network and a customer gateway, for example in a scenario in which a dedicated direct physical link is shared amongst a limited number of customers of a provider network. Also, in such arrangements, network packets travelling within a provider network received via a dedicated direct physical link may be segregated from other traffic within the provider network via tagging, but nevertheless may be unencrypted while flowing though the provider network to a particular customer's isolated virtual network. In contrast, an encryption VPG-IVN may be located proximate to a customer's IVN so that traffic directed to the customer's IVN is encrypted when flowing through the provider network up until it is decrypted at the encryption VPG-IVN proximate to the customer's IVN. Thus security of network traffic is enhanced by encrypting the traffic while travelling through at least a part of the provider network.

FIG. 2D illustrates traffic being enabled to flow between customer endpoints in a customer's isolated virtual network within a provider network and endpoints external to the provider network via encrypted communication tunnels, according to some embodiments. Once address information for the customer's instances in the customer's IVN is exchanged with an external endpoint via encrypted communication tunnels, as described above in regard to FIG. 2C, encrypted communication may be enabled between a customer's instances in a customer's isolated virtual network and external endpoints via a dedicated direct physical link. For example, traffic 216 is enabled to flow between customer instance 120A and customer device 145A via encrypted VPN tunnels 152A and 152B implemented on dedicated direct physical link 106.

Figure 3:
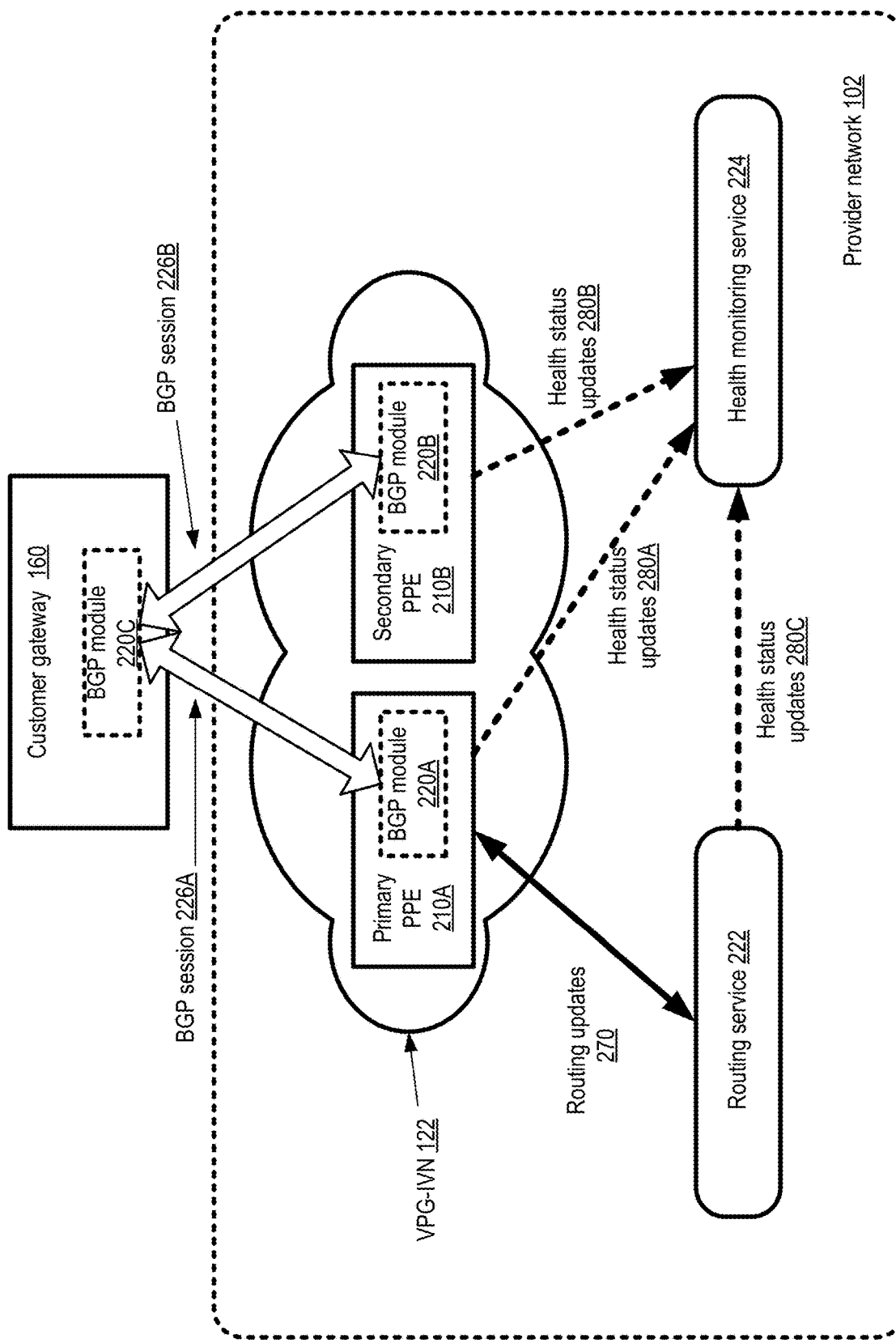
FIG. 3 illustrates example control-plane interactions associated with encrypted communication tunnel management at a provider network, according to some embodiments.

FIG. 3 illustrates example administrative ("control-plane") interactions associated with encrypted VPN (virtual private network) connection management at a provider network, according to at least some embodiments. In the depicted embodiment, the customer gateway uses BGP as its primary routing protocol. (Other routing protocols may be used in other embodiments.) As shown, respective BGP sessions 226A and 226B may be established between the customer gateway 160 and the PPEs 210A and 210B at a VPG-IVN 122. PPE 210A may comprise a BGP processing module 220A which participates in session 226A with a customer gateway BGP module 220C; similarly, PPE 210B may comprise a BGP processing module 220B that participates in session 226B with BGP module 220C of customer gateway 160. Routing changes and other BGP messages (e.g., messages indicating local preferences, weights, multi-exit discriminators (MEDs) and/or other routing attributes) may be received by the PPEs 210 from the customer gateway in the depicted embodiment, and transmitted for storage and analysis to a routing service 222. The internal routing updates 270 may use a routing service protocol different from BGP in at least some embodiment. For example, instead of using a session-oriented approach, a less stateful technique may be used in which the PPEs send routing messages via HTTPS or HTTP to the routing service. The routing information received from the PPEs may be stored in a persistent store of the routing service, such as a highly available distributed database system implemented at the provider network. At the routing service, aggregated routing information collected from a variety of sources may be analyzed to perform routing computations (e.g., shortest path or optical path calculations), which may be provided to the PPEs 210. The PPEs in turn may propagate the results of the routing computations to other routing devices, e.g., via BGP to the customer gateway 160. The routing service 222 may be implemented as multiple layers fronted by load balancers in some embodiments, as described below in further detail.

In the embodiment depicted in FIG. 2, the PPEs 210A and 210B, as well as various resources of the routing service 222, may be monitored by a health monitoring service (HMS) 224 of the provider network, as indicated by the health monitoring updates arrows labeled 280A, 280B and 280C. The health monitoring service 224 may perform several levels of analysis in some embodiments, starting with a relatively rapid first analysis to identify potential problems that may require immediate attention. If, for example, the HMS determines, based on the first stage of analysis of its collected health metrics, that the probability that a failure primary has occurred at PPE 210A is above some threshold, the role of primary PPE may be revoked and instead granted to PPE 210B. Asynchronously, the HMS may perform a deeper level analysis, e.g., taking more metrics into account or a longer time window of metrics into account, to determine a more accurate estimate of PPE 210A's failure and/or to confirm whether PPE 210A actually failed. Depending on the results of the more detailed analysis, the HMS may initiate longer-term actions, e.g., by requesting a resource provisioning service of the provider network to provide a replacement host or a replacement compute instance.

PPE Components

Figure 4:
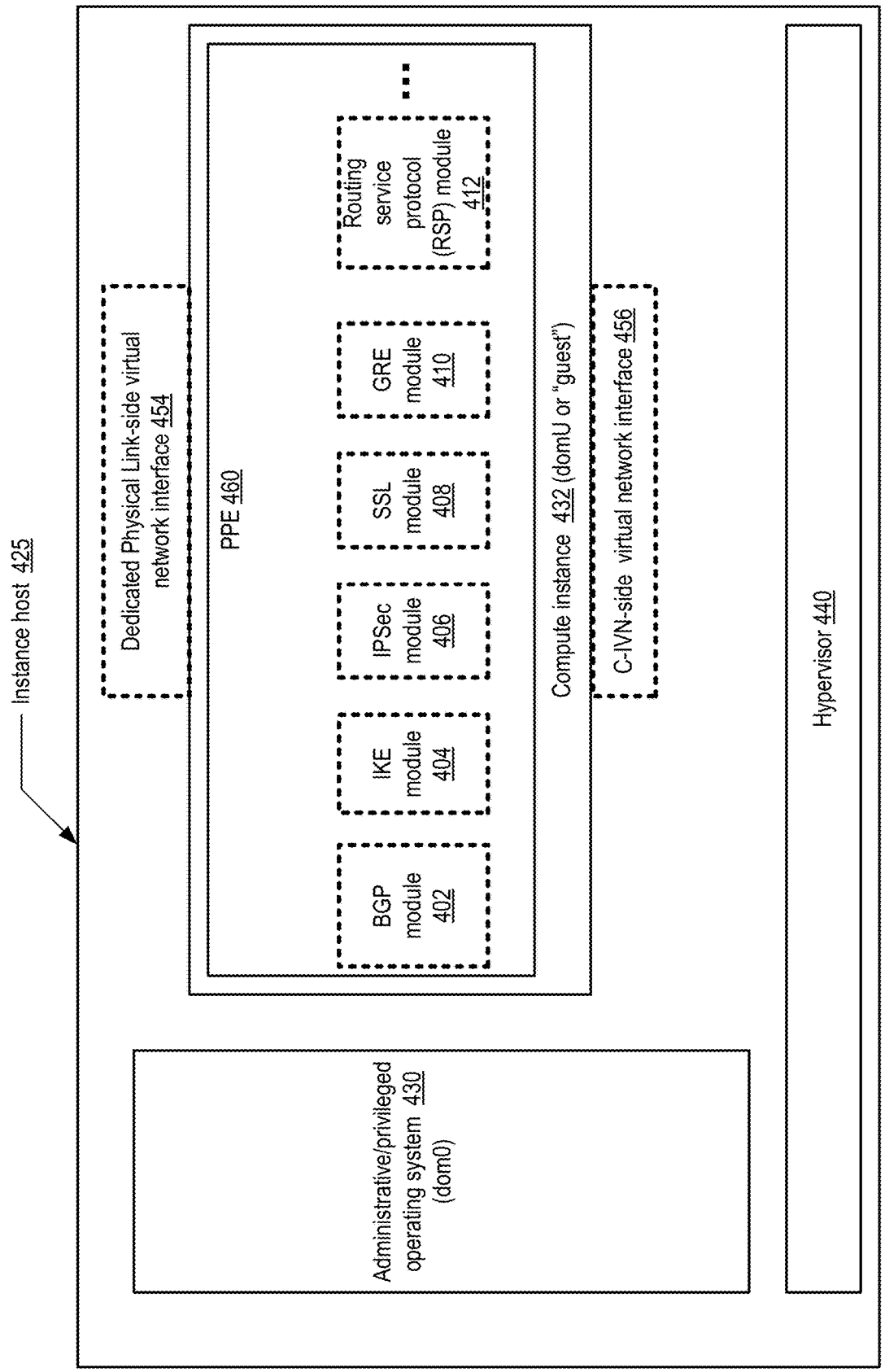
FIG. 4 illustrates example subcomponents of a protocol processing engine (PPE) of an encryption virtual private gateway (VPG), implemented at a compute instance of a provider network, according to some embodiments.

FIG. 4 illustrates example subcomponents of a protocol processing engine (PPE) of an encrypted VPG, implemented at a compute instance of a provider network, according to some embodiments. As mentioned earlier, a virtual computing service of the provider network may include numerous instance hosts, each of which may be capable of hosting multiple instances. In the depicted embodiment, a PPE 460 is implemented at a compute instance 432 of an instance host 425. The instance host 425 may comprise a plurality of hardware components (not shown in FIG. 4), which may include, for example, some number of processing cores or processors, at least one non-persistent memory which may be referred to as a main memory, one or more local persistent storage devices such as disks, and one or more network interface cards (NICs). Optional peripheral devices such as one or more monitors, mice, and the like may also be attached to the instance host in some implementations.

The hardware resources of the instance host 425 may be virtualized (e.g., presented to one or more virtual machines such as compute instance 432 booted or launched at the instance host as though each of the instances had exclusive access to the hardware) with the help of a virtualization management software stack that comprises a hypervisor 440 and/or an administrative instance of an operating system 430 in the depicted embodiment. The administrative instance of the operating system may be referred to as a "privileged domain" labeled "domain 0" or "dom0" in some implementations, while respective operating systems established for each of the compute instances 432 may be referred to as "unprivileged domains" (labeled "domU"), "guest virtual machines", "guest operating systems", or "guest domains". When a hardware component (such as a NIC used for incoming or outgoing traffic of the PPE 460) is to be utilized by a compute instance 432, e.g., due to an operation requested by the operating system or by an application running on top of the operating system, the hypervisor 440 may typically act as an intermediary between the instance and the hardware component. In some cases, depending for example on the programmatic interfaces being used, both the hypervisor 440 and the administrative operating system instance 430 may be intermediaries between the instance and the hardware. In at least some embodiments, a number of programmatic interfaces may be available to query the status of the compute instance(s) running on an instance host, the status of the administrative instance 430, and/or the status of the hypervisor 440. Such interfaces, which may form part of the control-plane of the virtual computing service, may be used by the health monitoring service to obtain health metrics in some embodiments as described below.

In the depicted embodiment, the PPE 460 instantiated at compute instance 432 comprises a number of subcomponents. The PPE 460 may in some embodiments comprise one or more processes or threads running on the compute instance. In at least some embodiments, a compute instance 432 may be primarily intended for use as a PPE, e.g., there may not be any other significant consumers of processing, memory, storage or networking resources at the instance than the PPE (and the underlying operating system). A given PPE may be able to process messages of a number of different protocols in the depicted embodiment, using respective modules. For example, PPE 460 may include a BGP module 402, an IKE module 404, an IPSec module 406, an SSL/TLS module 408, a GRE (Generic Routing Encapsulation) protocol module 410, a module for the routing service's protocol (RSP) 412, and so on. In some embodiments, in addition to or instead of the listed protocol modules, a PPE, such as PPE 460, may include other modules for other communication protocols, such as modules for Transport Layer Security (TLS protocol), Secure Real-time Transport protocol (SRTP), or other suitable encrypted communications protocols. At least some of the modules may be able to invoke programmatic interfaces of the other modules, e.g., the BGP and RSP modules may communicate with each other to translate BGP messages into RSP messages. In some embodiments, at least some of the components of the PPE may be implemented as respective daemons, processes or threads.

In some embodiments, compute instance 432 may have at least two virtual network interfaces (VNIs) attached for use by the PPE. VNI 454 may be used primarily for communications with external endpoints via a dedicated direct physical link (e.g., communications with customer gateway 160 via dedicated direct physical link 106). VNI 456 may be used primarily for communications with the customer's IVN, and is hence labeled a "C-IVN-side VNI" in FIG. 4. Other VNIs may also be attached to PPE 460's compute instance 432 in some embodiments, e.g., for control-plane interactions with the routing service and/or the HMS.

Additional Topologies Using Encryption VPGs

Figure 5:
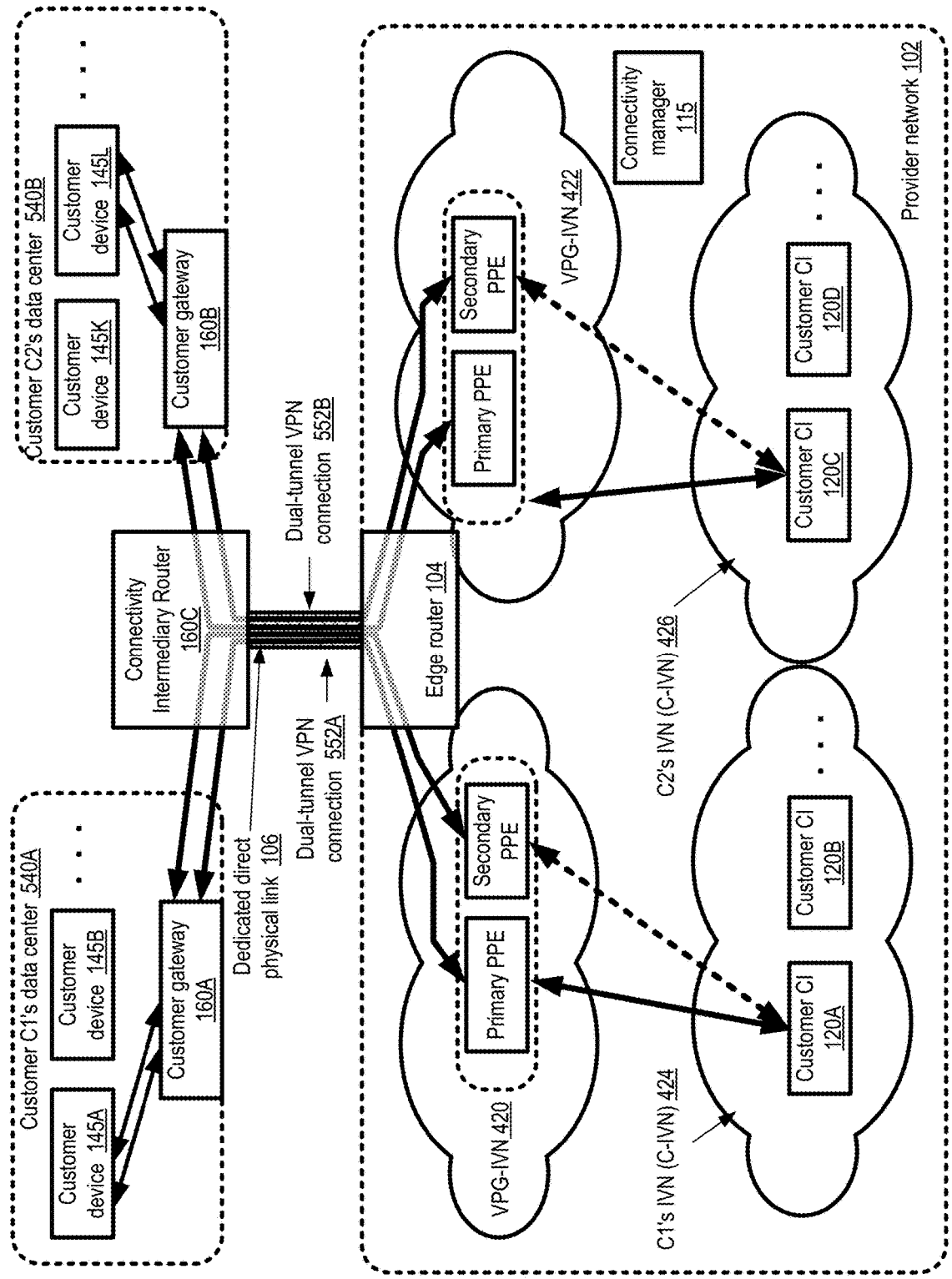
FIG. 5 illustrates an example system environment in which multiple encryption virtual private gateways (VPGs) enable connectivity to external endpoints over a partitioned dedicated direct physical link, according to some embodiments.

FIG. 2 illustrated a scenario in which an instance-based VPG comprising a pair of PPEs was used for VPN connectivity between a single customer data center and the customer's IVN within the provider network via a dedicated direct physical link. In some circumstances, a connectivity intermediary may be used by multiple customers of a provider network to provide at least a portion of a dedicated direct physical link between a provider network and the customer's data centers. For example FIG. 5 illustrates, customer C1 and customer C2 that share dedicated direct physical link 106 between provider network 102 and connectivity intermediary router 160C, according to some embodiments. An encrypted VPG 420 may be established for communications between customer C1's data center 540A and customer C1's customer instances 120A and 120B in customer C1's isolated virtual network 424 using dedicated direct physical link 106. Also, an encryption VPG 422 may be established for communications between customer C2's data center 540B and customer C2's customer instances 120C and 120D in customer C2's isolated virtual network 426. Encryption VPG's 420 and 422 may function in a similar manner as encryption VPGs described in FIGS. 2A-2E to establish encrypted dual tunnel VPN connections 552A and 552B.

Example Interactions for Partitioning a Dedicated Direct Physical Link

Figure 6:
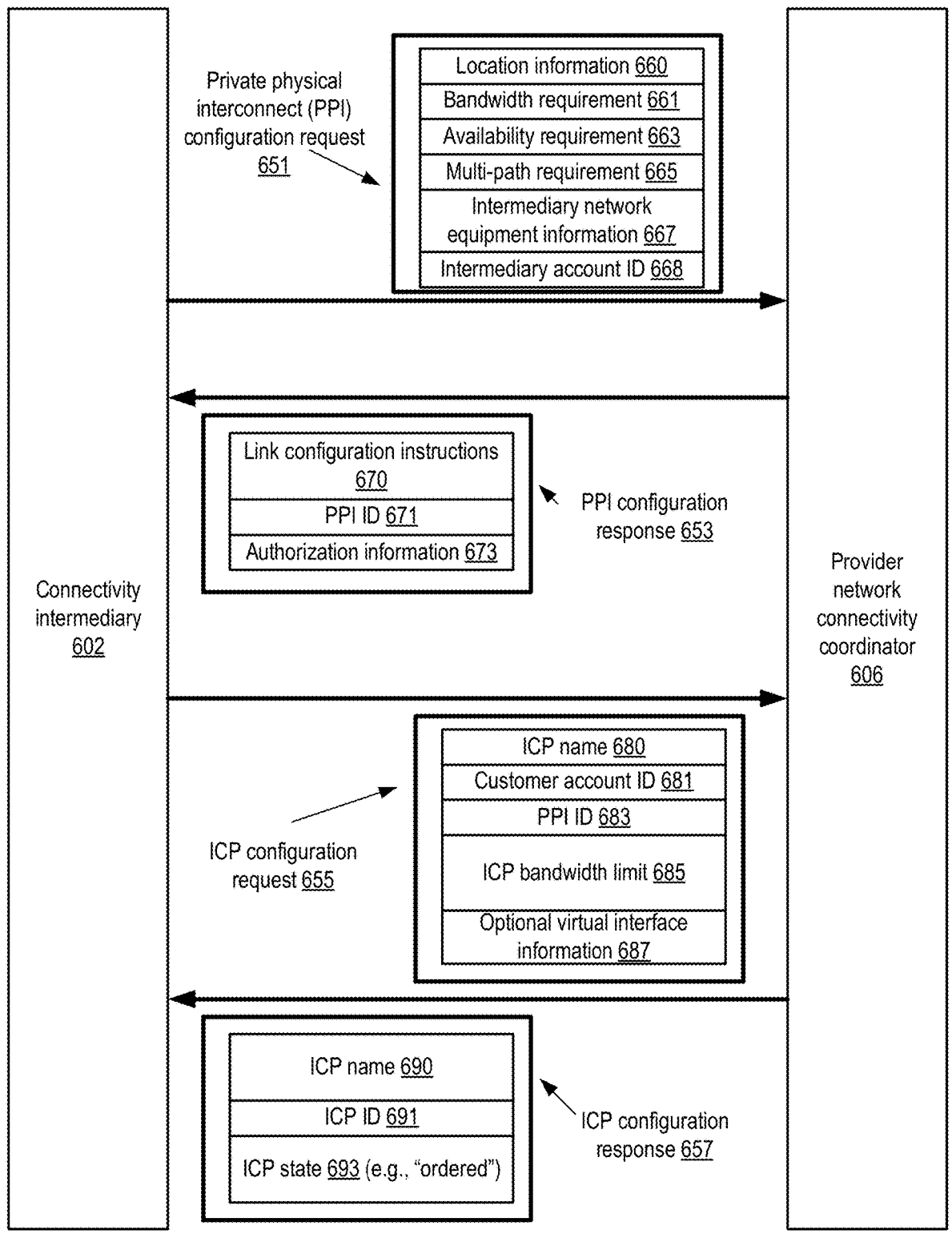
FIG. 6 illustrates example interactions between a connectivity intermediary and a provider network to configure an interconnect partition over a dedicated direct physical link, according to some embodiments.

FIG. 6 illustrates example interactions between a connectivity intermediary 602 and a provider network to configure an interconnect partition of a dedicated direct physical link, according to some embodiments. In the depicted embodiment, the dedicated direct physical link, also referred to herein as a private physical interconnect, may itself be configured first, and then additional interactions may be required to configure the interconnect partition (ICP). One or more programmatic interfaces for connectivity-related interactions may be implemented by an administrative component of the provider network such as connectivity coordinator 606 in various embodiments. As shown, the physical interconnect configuration request 651 may comprise location information 660, bandwidth requirement 661, availability requirement 663, multi-path requirement 665, intermediary network equipment information 667, and intermediary account identifier 668 (i.e., the client account established for the intermediary at the provider network). Not all these elements may be required in the physical interconnect configuration request; any combination or subset of these and other elements may be included in the requests in various embodiments.

The location information 660 may include details of a physical location at which a cross connect is desired: for example a street address where a connectivity intermediary router 160C currently exists or where such a router may need to be set up. In some implementations the intermediary may specify a desired bandwidth for the dedicated direct physical link via bandwidth requirement 661. The intermediary may choose from among a discrete set of bandwidth choices such as 500 Mbit/sec, 1 Gbit/sec or 10 Gbit/sec, where the choices may be derived from the details of the specific networking hardware available for establishing a physical link, such as edge router 104. For example, at some router co-location facilities, the choices for physical links may include 1 Gbit/sec 1000BASE-LX (1310 nm) single-mode fiber connections over single-mode fiber, and 10GBASE-LR (1310 nm) single-mode fiber connections over single-mode fiber, and the connectivity coordinator 606 may accordingly allow the intermediary to choose between the 1 Gbit/sec option and the 10 Gbit/sec option. In other cases the intermediary may be allowed to request any arbitrary bandwidth and the connectivity coordinator 606 may respond to the request by indicating the bandwidth it is able or willing to provide. In another implementation, the connectivity coordinator may indicate that more than one physical link may be needed— e.g., if the customer requests 20 Gbit/sec and the maximum bandwidth available over a single cable is 10 Gbit/sec. It may also be possible to set up multiple physical links distributed over different routers (or even different co-location facilities) in response to a single PPI configuration request 651—e.g., if a particular intermediary has access to multiple routers at the same facility or at different co-location facilities, one or more PPIs may be set up for each router.

In some embodiments the connectivity intermediary may also provide an availability requirement 663 and/or a multi-path requirement 665 as part of the request 651. The availability requirement may be expressible in any of various metrics such as desired maximum network outage limits (e.g., one hour per year maximum outage time) or mean time between outages. A multi-path requirement 665 may indicate the number of physical links that should be set up between a provider network router and an intermediary's router. Multiple physical links may for example be requested for performance (e.g., so that traffic may be load-balanced or otherwise distributed over multiple physical paths, thereby reducing network congestion), for higher availability (e.g., by providing multiple paths, an alternate path may be available as a backup path in case of a failure at one of the physical links), or a combination of performance and availability reasons. In addition to specifying how many physical links are needed, a client may also specify the manner in which traffic is to be distributed among them. In a case where two paths are requested, for example, the client may specify whether they should be established in an active/active mode (e.g., where Border Gateway Protocol (BGP) multi pathing is used to balance load across the two links, and in case of a failure, one link takes over the other's traffic), or in active/standby mode where only one of the links is in use at a time, and the second link is activated only in the event of a failure at the first link. Default choices (e.g., active/active) may be used in some implementations, so that the intermediary need not explicitly specify the type of multi-path setup. In some cases, indicating a multi-path requirement 665 may negate the need for (or contradict) an availability requirement 663, so the connectivity intermediary 602 may be allowed to specify only one of these two types of options.

In one embodiment, in order to further simplify the tasks that the connectivity intermediary may need to do to establish connectivity at their end, or to optimize performance, the connectivity coordinator 606 may also be able to provide configuration instructions, suggestions, and/or preferred settings for the specific type of networking equipment that the intermediary may have. In such an environment, an intermediary may provide network equipment information 667 to connectivity coordinator 606, which may for example consult a database of configuration data to look up configuration instructions for the equipment, and provide configuration suggestions or instructions to the intermediary. If equipment information 667 indicates that the intermediary uses a particular type or class of router from a particular vendor (e.g., a Cisco router, a Juniper router, or a Yamaha router), for example, the connectivity coordinator may be able to provide vendor-specific configuration hints for the particular type of router or for a particular version of software running on that particular router. Such hints may include examples of how to configure or verify BGP settings, tunneling-related settings, IKE (Internet Key Exchange) settings, and may also include instructions on how to test that the particular vendor's device is operating effectively. Troubleshooting hints and/or tuning hints such as preferred buffer sizes and the like that may be vendor-specific and/or device-specific may also be provided by connectivity coordinator 606 in some embodiments. In various embodiments information similar to that shown in request 651 may be communicated in multiple steps to the connectivity coordinator 606—e.g., first location information and desired bandwidth may be communicated, then the connectivity coordinator may provide a response with a list of possible options, and then from among the possible options the intermediary may choose one option and provide additional specifications in subsequent messages.

After the appropriate metadata for the PPI has been generated and stored, the connectivity coordinator may provide a configuration response 653 to the connectivity intermediary's configuration request 651 in some embodiments. The response may include, for example, a PPI identifier 671 for the newly created PPI, link configuration instructions 670 and authorization information 673. The link configuration instructions 670 may for example pinpoint the exact physical coordinates where a cable originating from an intermediary router is to be attached: e.g., a physical port (e.g., "port 3" or "the third port from the left"), a cage identifier, a rack identifier, and a patch panel identifier may be included for the cable. In addition, in some cases device-specific hints or instructions may be provided for the particular type of networking equipment being used. Authorization information 673 may include a legally-binding agreement to allow a technician to access the provider network router, for example. After the physical link is established between the two routers, in at least some embodiments some number of tests may be run (by the connectivity coordinator, the intermediary, or both) to ensure that the PPI is working as intended.

The connectivity intermediary may subsequently submit an ICP configuration request 655, for enabling connectivity between a particular customer and the provider network, to the connectivity provider in some embodiments. The ICP configuration request 655 may include, for example, an ICP name 680, the account identifier 681 of the customer for whom the ICP is being requested, the PPI identifier 683, and an ICP bandwidth limit that is a portion of the currently-available bandwidth capacity of the PPI. (For example, if the intermediary has already dedicated 700 Mbit/sec of a 1 Gb/sec PPI bandwidth capacity for other ICPs, the maximum bandwidth limit allowed for the new ICP may be 300 Mbit/sec.) In some embodiment, if the connectivity intermediary has already partially or fully configured a virtual interface on behalf of the customer (as described below in the context of FIG. 7A) the ICP configuration request may include optional virtual interface information 687.

If the ICP configuration is successful (i.e., if metadata corresponding to the requested ICP is successfully generated and stored at the provider network), the connectivity coordinator 606 may provide an ICP configuration response 657. The response may confirm the ICP name 657, provide a newly-generated ICP identifier 691 and in at least some embodiments, indicate a current state 693 of the ICP (e.g., an "ordered" state, indicating that the ICP has not yet been activated and that the connectivity coordinator is awaiting customer acceptance of billing responsibility for it).

Figure 7A:
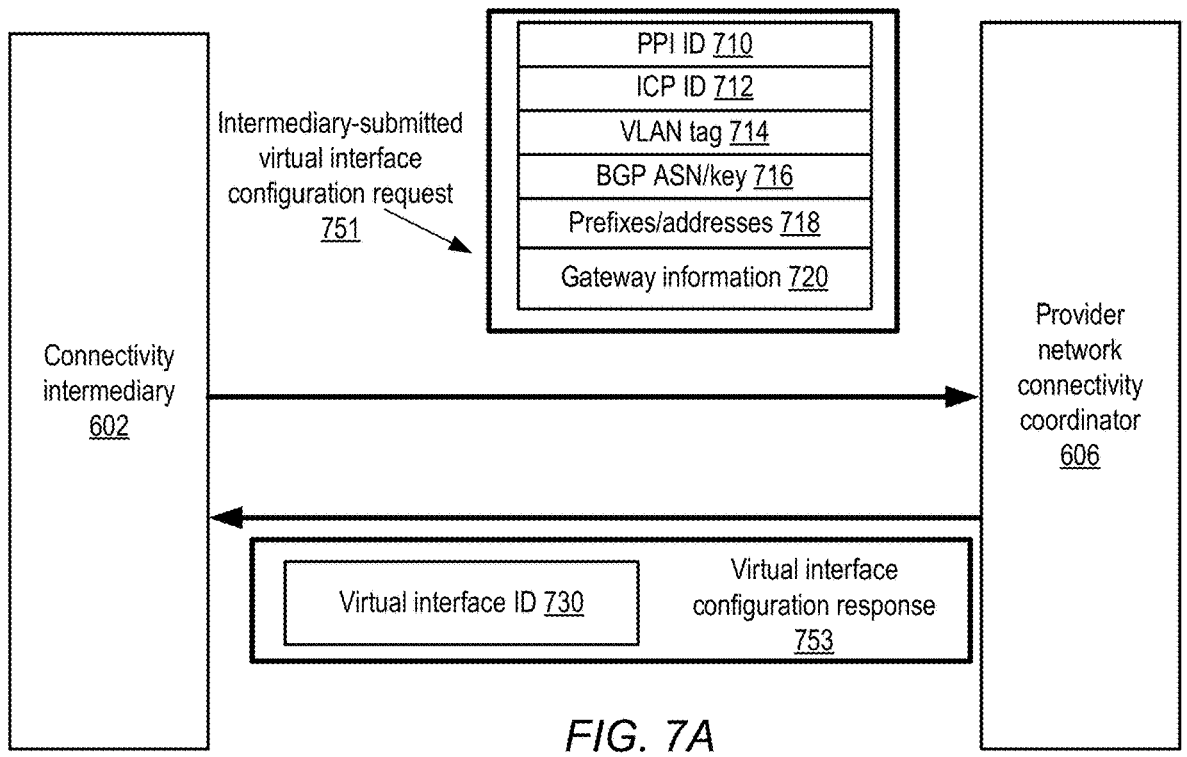
FIG. 7A illustrates example interactions between a connectivity intermediary and a provider network to configure a virtual interface associated with an interconnect partition over a dedicated direct physical link, according to some embodiments.
Figure 7B:
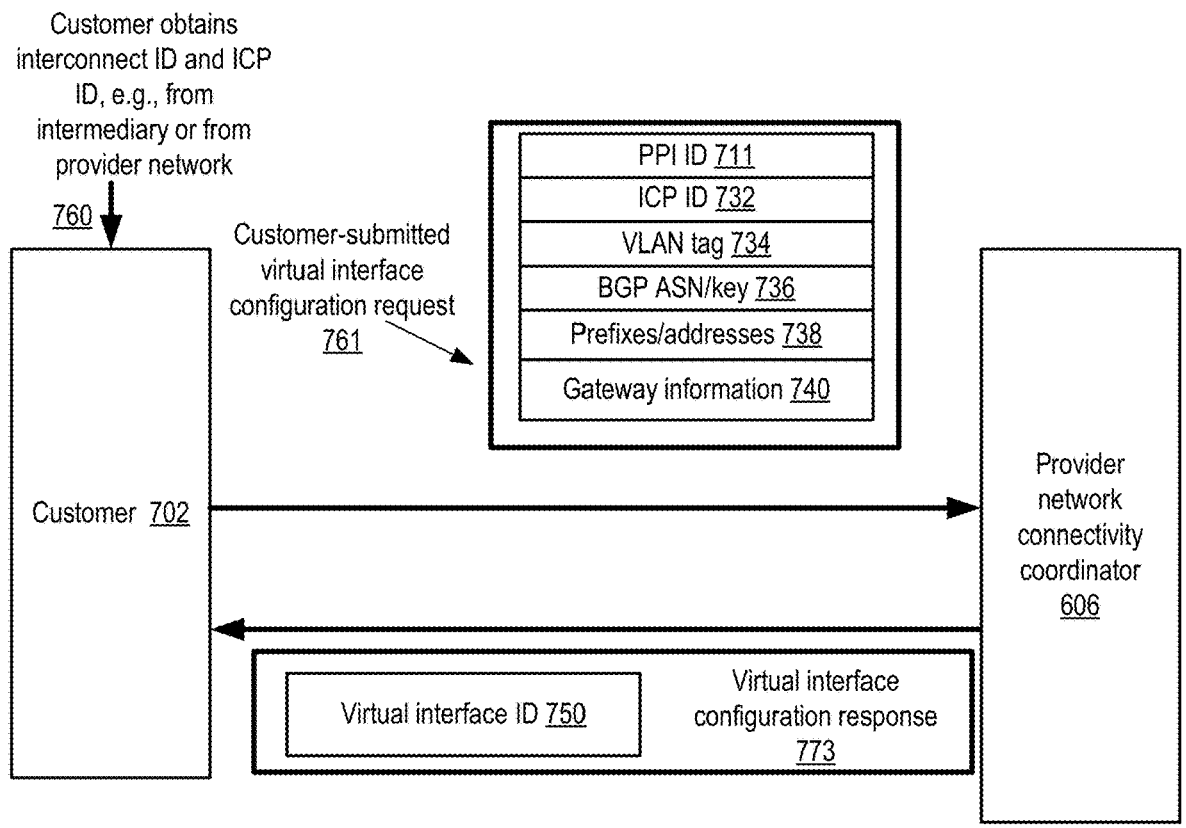
FIG. 7B illustrates example interactions between a customer or client on whose behalf an interconnect partition has been established, and a provider network, to configure a virtual interface associated with the interconnect partition over a dedicated direct physical link, according to some embodiments.

As described earlier, in at least some embodiments a virtual interface may have to be configured for traffic associated with a dedicated direct physical link to flow between a network device external to the provider network, and some set of resources within the provider network. A virtual interface may allow the isolation or segregation of network packets associated with different ICPs of the same PPI, e.g., using respective VLAN tags corresponding to each virtual interface and inserted into the transmitted network packets. In various embodiments, virtual interface configuration may be initiated by the connectivity intermediary, the customer that is to utilize the ICP, or by either the intermediary or the customer. FIG. 7A illustrates example interactions between a connectivity intermediary and a provider network to configure a virtual interface associated with an interconnect partition, according to at least some embodiments. FIG. 7B illustrates similar example interactions between a customer or client on whose behalf an interconnect partition has been established, and a provider network, to configure a virtual interface associated with the interconnect partition, according to at least some embodiments.

As shown in FIG. 7A, an intermediary-submitted virtual interface configuration request may include some combination of the following in the depicted embodiment: a PPI identifier 710 of the interconnect (e.g. dedicated direct physical link) to be used, an ICP identifier 712 of the partition with which the virtual interface is to be associated, a VLAN tag 714, BGP ASN and/or key information 716, public or private network prefixes or addresses 718, gateway information 720 and/or pairing information 722. Connectivity coordinator 606 may require a unique VLAN tag 714 for each virtual interface in some embodiments, so that the network packets associated with that virtual interface can be distinguished by network devices such as routers, switches and the like. In one implementation the VLAN tag 714 may be required to comply with a standard, such as the IEEE 802.1Q standard. The intermediary may also be required to provide a BGP Autonomous System Number (ASN) in some embodiments. An Autonomous System (AS) is a collection of connected Internet Protocol (IP) routing prefixes under the control of one or more network operators that presents a common, clearly defined routing policy to the Internet. A unique ASN is typically allocated to each AS for use in BGP routing. The ASN provided by the intermediary may be public (i.e. may be exposed to various routers of the public Internet) or private (exposed only to routers of the provider network 102 and the intermediary or customer networks), depending on the type of connectivity desired. The intermediary may also provide a set of network prefixes 718 to be advertised for the virtual interface, e.g., in accordance with BGP or another routing protocol. Gateway information 720 may be provided for access to the customer's isolated virtual network (comprising resources within the provider network). In some embodiments Multiple Protocol Label Switching (MPLS) techniques may be used to implement logical network isolation. While the constituent elements illustrated in FIG. 7A may be applicable in environments where BGP and related protocols are in use, in other embodiments other network isolation mechanisms (e.g. any other techniques usable for connecting to virtual private clouds or VPNs) may be supplied by the intermediary or the customer and used by connectivity provider for logical network isolation.

A response 753 may be provided to the intermediary's virtual interface configuration request, indicating (if the configuration was successful) an identifier of the newly-created virtual interface. Such a response may be provided after the appropriate networking configuration operations (such as changes to various routing tables) have been completed and/or propagated in some embodiments. As indicated in FIG. 7B, in some embodiments a customer (rather than the connectivity intermediary) may submit a virtual interface configuration request 761 to the connectivity coordinator 606. Similar information may be included in at least some embodiments within the customer-submitted virtual interface configuration request as is included in the intermediary-submitted request 751 of FIG. 7A. In some embodiments, the customer may be provided at least a subset of the information needed for the parameters of configuration request 761, e.g., the PPI ID and/or the ICP ID may be provided to the customer programmatically by the intermediary or the connectivity coordinator as indicated by arrow 760. A response 773 analogous to response 753 may be provided to the customer's virtual interface configuration request 761, with an identifier of the newly-created virtual interface. The successful completion of the virtual interface configuration may be followed by tests to confirm that traffic flows as expected over the PPI in some embodiments, e.g., packet transfer tests may be initiated by the provider network, the connectivity intermediary and/or the customer to verify the desired connectivity.

In some embodiments, a provider network connectivity coordinator, such as provider network connectivity coordinator 606 may be included in a connectivity manager, such as connectivity manager 115 illustrated in FIGS. 1-3 and 5. In some embodiments a connectivity coordinator for dedicated direct physical links and a connectivity manager for encrypted VPN connections may be separate services of a provider network. For example, a customer may first set of a dedicated direct physical link using a connectivity coordinator and may subsequently request an encrypted VPN connection over the dedicated direct physical link using a connectivity manager.

Dynamic Selection of Instance Types for PPEs

Figure 8:
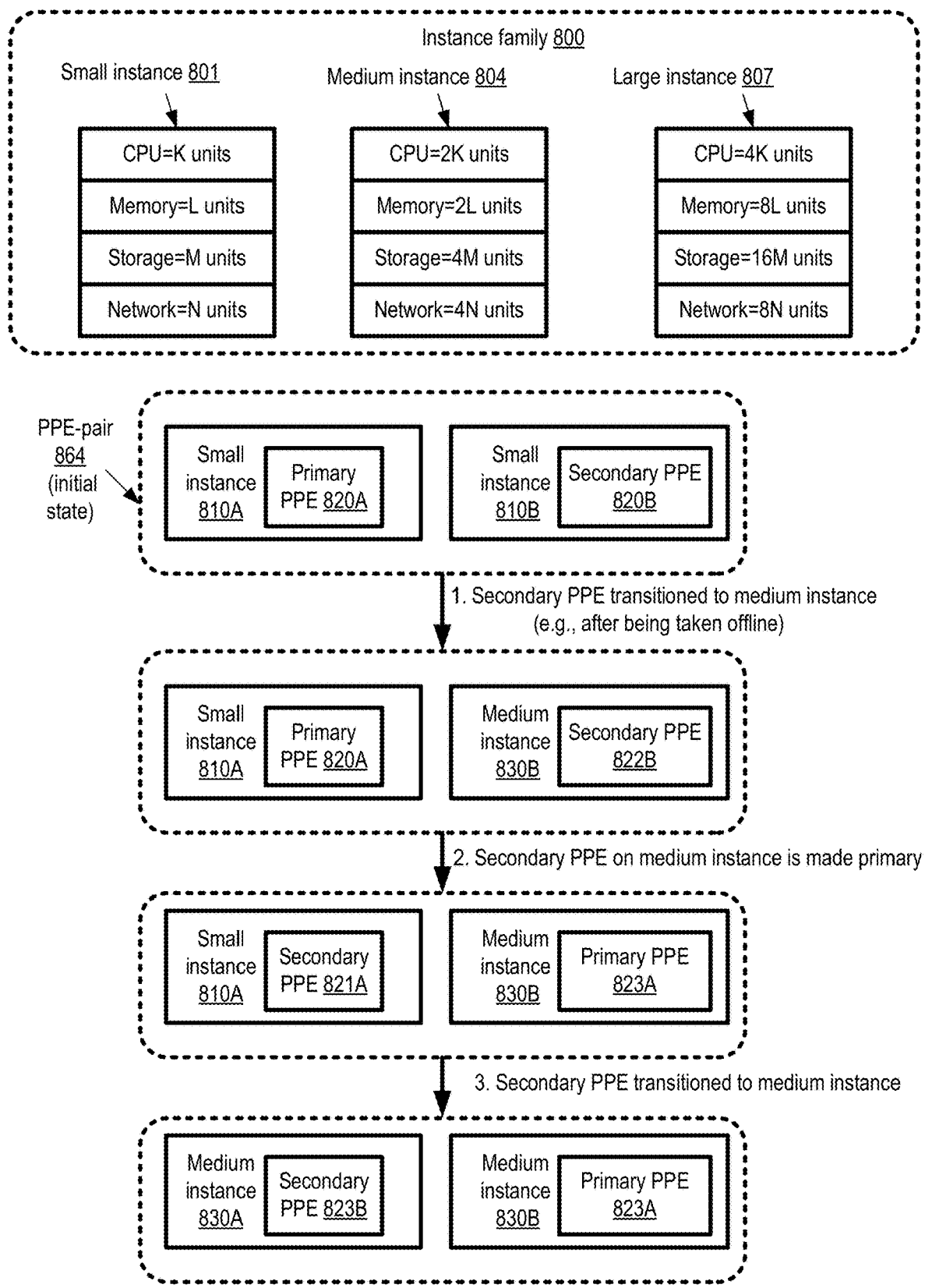
FIG. 8 illustrates examples of compute instance types that may be employed for protocol processing engines (PPEs) of an encryption virtual private gateway (VPG), according to some embodiments.

FIG. 8 illustrates examples of compute instance types that may be employed for PPEs, according to at least some embodiments. The virtual computing service of the provider network may allow the selection of different types of compute instances from an instance "family" 800 of pre-defined types in the depicted embodiment. Instance family 800 may comprise small instances 801, medium instances 804, and large instances 808, with different capacities for the different instance types with respect to computing power, memory, storage and networking. In the examples shown, the computing capability (which may be expressed in units selected by the provider network operator) of medium instances is twice that of small instances, while the computing capability of large instances is twice that of medium instances. The ratio of the available memory between small, medium and large instances is 1:2:8, the ratio for storage is 1:4:16, and the ratio for network bandwidth is 1:4:8. Instance types with different capacity ratios than those shown in FIG. 8 may be supported in different embodiments.

In some embodiments, the connectivity manager 115 or other control-plane components of the provider network may monitor resource utilizations at the compute instances used for the PPEs, and may select the appropriate instance types to be used initially for a given VPN connection on the basis of resource utilization metrics collected over time. For example, for PPE-pair 864 of FIG. 8 established for a given VPN customer C1, both the primary PPE 820A and the secondary PPE 820B may initially be executed using respective small instances 810A and 810B. If the workload associated with C1's VPN grows beyond some threshold, a decision may be made to move up to a more powerful set of instances, e.g., a transition from small to medium instances may be implemented. In some embodiments, such a transition may be coordinated by the connection manager 115, for example, or such a transition may be managed by the health monitoring service.

In the embodiment shown in FIG. 8, the transition from using small instances to medium instances may be performed in several stages. First, as indicated by the arrow labeled "1", the secondary PPE may be moved from small instance 810B to a medium instance 830B. In some implementations, the secondary PPE may have to be taken offline briefly for the transition (e.g., to shut down the secondary PPE process, apply the necessary network configuration changes, and start a replacement process), while in other implementations live migration of the secondary PPE may be implemented. The transitioned secondary PPE at medium instance 830B is labeled 822B in FIG. 8. Next, as indicated by the arrow labeled "2", the roles of primary and secondary may be switched, transforming the previous primary PPE into secondary PPE 821A, and the previous secondary 822B to primary 823A. Finally, as indicated by the arrow labeled "3", the secondary PPE may be transitioned to a medium instance 830A using a procedure similar to that discussed for the transition labeled "1". In other embodiments, a different approach may be taken to transitions between instance types—e.g., both PPEs may be live migrated to a different instance in parallel, or both may be taken offline briefly, or a substitute PPE pair may be established for the transition period and then freed after the PPEs have been launched at the appropriately-sized instances. In at least one embodiment, a PPE may be transitioned to a smaller instance type if its workload remains below some threshold level for a sustained time period.

PPEs at Multi-Tenant Instance Hosts

For a variety of reasons, instance hosts may often be used in a single-tenant mode to implement PPEs—e.g., only one compute instance may be launched on the instance host, and that compute instance may be used for a single PPE. Such a single-tenant approach may help reduce the probability of security breaches, and the probability of impacting performance of one VPN connection due to another, for example. However, the single tenant approach may sometimes lead to less-than-optimal levels of resource utilization at the instance host. For example, it may typically be possible to launch several small instances on a given instance host, and using such a host for just one small instance may not be considered ideal. Accordingly, in at least some embodiments, PPEs may be set up on instance hosts in a multi-tenant mode.

FIGS. 8a and 8b illustrate examples of configurations in which an instance host may be used in a multi-tenant environment for PPEs, according to at least some embodiments. In FIG. 8a, PPE 804A for one VPN connection V1 is implemented at a first instance 802A at an instance host 325, while PPE 804B for a different VPN connection V2 is implemented at a second instance 802B. VPN connections V1 and V2 may be established on behalf of the same customer in the depicted embodiment. In FIG. 8b, a single compute instance 802A at instance host 325 comprises a plurality of PPEs 804A (for VPN connection V1) and 804B for (VPN connection V2), while another PPE 804C is implemented at instance 802B for a third VPN connection V3. In some embodiments in which instance hosts are being used for PPEs of different VPN connections, the connection manager may try to ensure that different PPEs of the same VPN connection are not co-located within the same instance, e.g., so that a failure of a single instance does not result in both PPEs of a PPE-pair becoming unavailable. In some embodiments, in a different approach to multi-tenancy, a single instance may be used for PPEs configured for two different VPGs. According to one embodiment, customers may be given the option of indicating their preference for multi-tenancy versus single-tenancy with respect to PPE configurations. The pricing policies applicable to multi-tenant configurations may be different than those applied to single-tenant configurations—e.g., VPN connectivity implemented using multi-tenant hosts may cost less than VPN connectivity via single-tenant hosts. In one embodiment, a customer may be able to programmatically indicate a desired availability level or range for one or more VPN connections, and the connectivity manager may use the indicated availability preferences to determine whether single-tenancy or multi-tenancy should be used for the customer.

Figure 9:
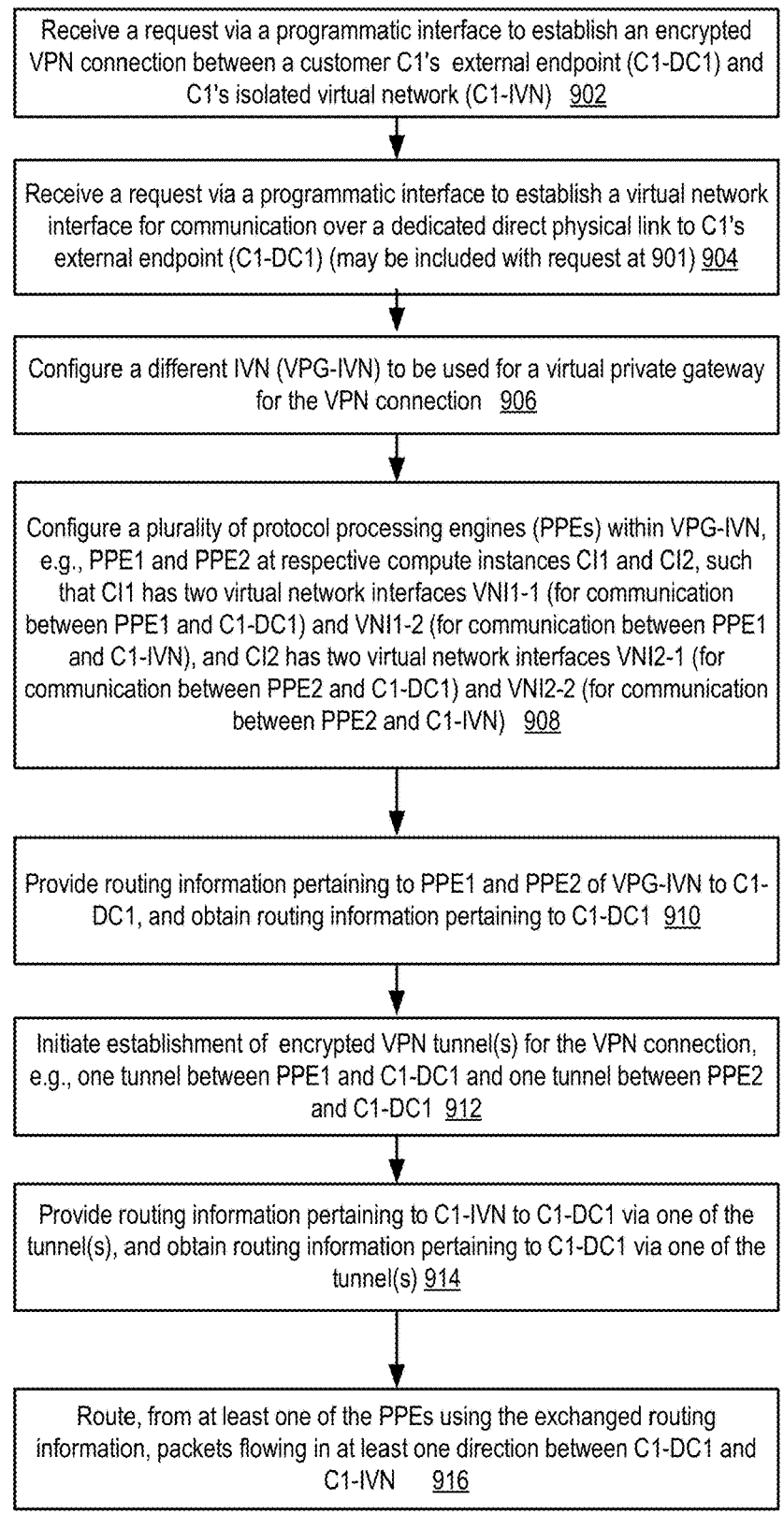
FIG. 9 is a flow diagram illustrating aspects of operations that may be performed to implement encrypted communication connectivity between an endpoint at a customer data center and the customer's isolated virtual network, according to some embodiments.

Methods of Providing Encrypted VPN Connectivity using Dedicated Direct Physical Links FIG. 9 is a flow diagram illustrating aspects of operations that may be performed to implement encrypted VPN connectivity between an external endpoint such as at a customer data center and the customer's IVN, according to at least some embodiments. A connectivity service of a provider network (e.g., a service responsible for implementing encrypted VPNs, connections via direct dedicated physical links similar to link 106 of FIGS. 1-3 and 5, and the like) may define and expose a set of programmatic interfaces for connectivity establishment and configuration. As shown in element 902, a request may be received (e.g., at a connectivity manager 115 of the service) via one such interface from a client C1, requesting the establishment of a VPN connection between C1's data center (C1-DC) and C1's IVN (C1-IVN) within the provider network. In the same request a virtual network interface for communication over a specified dedicated direct physical link may be requested. Alternatively, at 904 a virtual interface for a dedicated direct physical link to an external endpoint such as a customer data center may be requested via a separate request.

The connectivity manager may attempt to determine whether a VPG (virtual private gateway) has already been established for connectivity to C1-IVN, e.g., in response to an earlier encrypted VPN connection request for some other endpoint or data center of C1. The connectivity service may have a configuration database that can be searched by customer, by IVN, or based on other query parameters, for example. If no such pre-existing VPG is found, a new VPG may be established. A new IVN may be configured specifically for the VPG by the connectivity manager (element 906), and a selected number of PPEs may be instantiated at one or more compute instances within the newly configured VPG-IVN (element 908). The number of PPEs created, the mappings of the PPEs to instances, and the types/sizes of the instances may vary from one implementation to another. In the depicted embodiment, each PPE may have a pair of virtual network interfaces (VNIs) configured, with one VNI of the pair to be used for encrypted traffic between the external endpoint and the PPE via the dedicated direct physical link and the other VNI to be used for decrypted traffic between the PPE and C1-IVN.

Once the PPE are instantiated a routing protocol session may be initiated (910) between the PPEs and the external endpoints connected to the provider network via the dedicated direct physical link. Routing information pertaining to the PPEs may be shared with the external endpoint and routing information of the external endpoint may be received at the PPE via the routing protocol session.

At least a pair of VPN tunnels may be established, one between a first PPE of the VPG and the customer data center, and the second between a second PPE of the VPG and the customer data center (element 912). The procedure for establishment of the tunnels may vary, depending on the specific VPN protocol being used—for example, in an embodiment in which IKE and IPSec are being used, keys and IP addresses may programmatically be provided for a customer gateway at the customer data center. After the tunnels have been set up, routing information may be exchanged in both directions (element 914). For example, routing information pertaining to C1-IVN may be sent to the customer gateway via one or both tunnels, and routing information pertaining to the customer data center may be received from the customer gateway at one or both the PPEs via the tunnels. Using the routing information, customer C1's data packets may be transmitted in either direction along the VPN pathway (element 916). For example, packets originating at a customer device within C1-DC1 may be encrypted at the customer gateway, sent in encrypted form to one of the PPEs, decrypted at the PPE and sent via an internal pathway within the provider network to a destination customer instance within C1-IVN. Similarly, packets generated at a customer instance within C1-IVN may be sent in plain text to a selected PPE of the VPG, encrypted at the PPE, and sent to the customer gateway at C1-DC for decryption on its way to a targeted customer device at C1-DC via the dedicated direct physical link.

In at least some embodiments in which pairs of PPEs are established for connectivity between a customer data center and some other destination group such as C1-IVN, one of the PPEs of the pair may be selected as the primary or active PPE (e.g., by a routing service as described below), while the other PPE may be designated as a secondary or backup PPE. In some implementations, multiple secondary or backup PPEs may be established. In the event of a failure at the primary, a secondary PPE may be selected to take over as the primary, e.g., by a health monitoring service as described below in further detail. In some embodiments, the connectivity service may collect and analyze various metrics obtained from the PPEs and/or the VPN network paths, and may reconfigure various entities involved in the VPN connections as needed. For example, the types of compute instances being used for the PPEs for a given customer may be changed over time in response to changes in VPN traffic patterns—e.g., more performant instance types may be configured in response to sustained increases in workloads, or less powerful instance types may be used if workload levels remain low over long periods.

Illustrative Computer System

Figure 10:
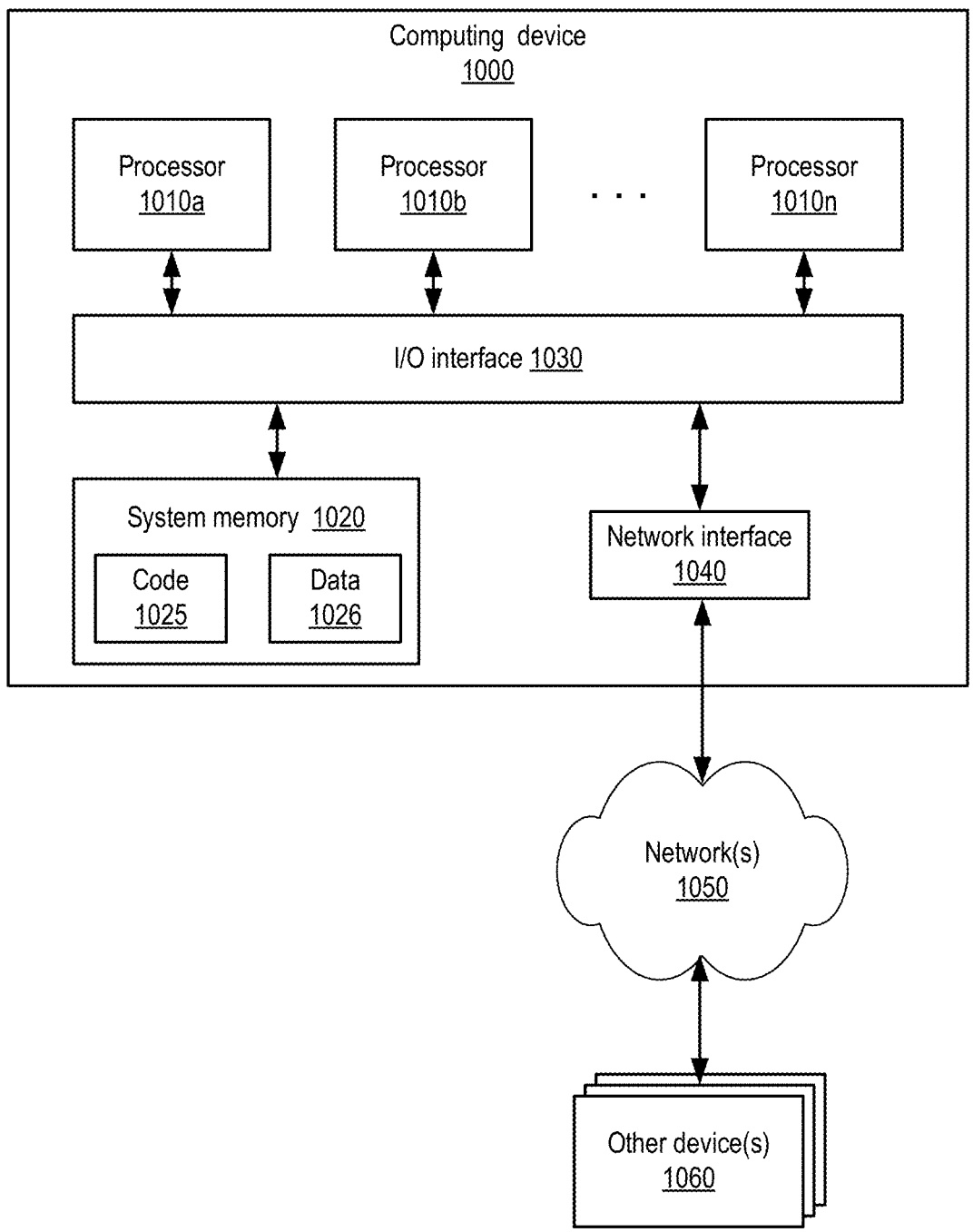
FIG. 10 is a block diagram illustrating an example computing device that may be used in some embodiments.

In at least some embodiments, a server that implements a portion or all of one or more of the technologies described herein, including the techniques to implement the PPEs, instance hosts, various front-end and back-end health monitoring service nodes and/or routing service nodes, may include a general-purpose computer system that includes or is configured to access one or more computer-accessible media. FIG. 10 illustrates such a general-purpose computing device 1000. In the illustrated embodiment, computing device 1000 includes one or more processors 1010 coupled to a system memory 1020 (which may comprise both non-volatile and volatile memory modules) via an input/output (I/O) interface 1030. Computing device 1000 further includes a network interface 1040 coupled to I/O interface 1030.

In various embodiments, computing device 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some implementations, graphics processing units (GPUs) may be used instead of, or in addition to, conventional processors.

System memory 1020 may be configured to store instructions and data accessible by processor(s) 1010. In at least some embodiments, the system memory 1020 may comprise both volatile and non-volatile portions; in other embodiments, only volatile memory may be used. In various embodiments, the volatile portion of system memory 1020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces such as various types of persistent and/or volatile storage devices. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other devices 1060 attached to a network or networks 1050, such as other computer systems or devices as illustrated in FIG. 1 through FIG. 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIG. 1 through FIG. 18 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
a plurality of instance hosts comprising computing devices configured to host one or more instances; and
one or more computing devices of a provider network configured to implement a connectivity manager configured to provide a high availability virtual private network (VPN), wherein to provide the high availability VPN, the connectivity manager is configured to cause a virtual private gateway to be established for a virtual network including the one or more hosted instances, wherein to establish the virtual private gateway, the connectivity manager is configured to:
assign the one or more instances to the virtual private gateway;
provide one or more virtual network interfaces to the one or more instances; and
implement one or more protocol processing engines for exchanging routing information with a network external to the provider network,
wherein the one or more protocol processing engines are configured to:
establish a border gateway protocol (BGP) session to exchange routing information for the one or more instances assigned to the virtual private gateway with the network external to the provider network, wherein the BGP session is established via the one or more virtual network interfaces and a network link established between the provider network and the network external to the provider network;
establish, using the exchanged routing information, a plurality of VPN tunnels between the network external to the provider network and the one or more instances assigned to the virtual private gateway via the network link;
establish additional respective BGP sessions within respective ones of the plurality of VPN tunnels to exchange routing information of one or more instances included in the virtual network with the network external to the provider network, wherein establishment of the additional respective BGP sessions within the respective ones of the plurality of VPN tunnels provides encrypted communication channels for the exchange of the routing information to the network external to the provider network; and
enable encrypted communications to flow between the one or more instances included in the virtual network and the network external to the provider network via the plurality of VPN tunnels implemented via the network link.

2. The system of claim 1, wherein two or more instances are assigned to the virtual private gateway, and wherein each of the two or more instances are configured to perform said establishing a BGP session, said establishing a VPN tunnel, said establishing additional respective BGP sessions, and said enabling encrypted communications, such that two or more VPN tunnels are established that each enable encrypted communications to flow between the one or more instances included in the virtual network and the network external to the provider network.

3. The system of claim 1, wherein the plurality of VPN tunnels are implemented in accordance with an IPSec protocol.

4. The system of claim 1, wherein the plurality of instance hosts implement one or more virtual machines.

5. The system of claim 1, wherein said establishing the plurality of virtual private network (VPN) tunnels between the external network and the one or more instances assigned to the virtual private gateway comprises establishing two VPN tunnels between the external network and the one or more instances assigned to the virtual private gateway.

6. The system of claim 1, wherein one or more edge routers used to implement the network link are located at a co-location facility.

7. The system of claim 1, wherein the one or more protocol processing engines are implemented on one or more virtual machines.

8. The system of claim 1, wherein:
the network link established between the provider network and the network external to the provider network is implemented via a plurality of physical connections; and
the connectivity manager is further configured to:

detect a failure of a first one of the plurality of physical connections; and automatically failover the encrypted communications to flow over a remaining one of the plurality of physical connections.

9. A method of providing a high-availability virtual private network (VPN), the method comprising:

establishing a virtual private gateway for a virtual network implemented within a provider network, wherein establishing the virtual private gateway comprises:

assigning one or more instances within the provider network to the virtual private gateway;

providing one or more virtual network interfaces to the one or more instances;

implementing one or more protocol processing engines on one or more instance hosts, hosting the one or more instances, for exchanging routing information with an external network, external to the provider network;

establishing, via the one or more protocol processing engines, a border gateway protocol (BGP) session to exchange routing information for the one or more instances assigned to the virtual private gateway with the external network, wherein the BGP session is established via the one or more virtual network interfaces and a network link established between the provider network and the external network;

establishing, using the exchanged routing information, a plurality of VPN tunnels between the external network and the one or more instances assigned to the virtual private gateway via the network link;

establishing, via the one or more protocol processing engines, additional respective BGP sessions within the plurality of VPN tunnels to exchange routing information of one or more instances included in the virtual network with the external network, wherein establishment of the additional respective BGP sessions within the plurality of VPN tunnels provides an encrypted communication channel for the exchange of the routing to the external network; and enabling encrypted communications to flow between the one or more instances included in the virtual network and the external network via the plurality of VPN tunnels implemented via the network link.

10. The method of claim 9, wherein said establishing the plurality of virtual private network (VPN) tunnels between the external network and the one or more instances assigned to the virtual private gateway comprises establishing two VPN tunnels between the external network and the one or more instances assigned to the virtual private gateway.

11. The method of claim 10, wherein the two VPN tunnels encrypt network traffic in accordance with an IPSec protocol.

12. The method of claim 9, wherein the one or more instances implement one or more virtual machines.

13. The method of claim 9, wherein one or more edge routers used to implement the network link are located at a co-location facility.

14. The method of claim 9, wherein the one or more protocol processing engines are implemented on one or more virtual machines.

15. The method of claim 9, wherein to establish the plurality of virtual private network tunnels, the one or more virtual network interfaces for the protocol processing engines are configured to use VLAN tags.

16. The method of claim 9, further comprising:

detecting a failure of a first one of the plurality of VPN tunnels; and causing an automatic failover, wherein the encrypted communications flow over a remaining one of the plurality of VPN tunnels.

17. One or more non-transitory, computer-readable storage media, storing program instructions, that when executed implement a high-availability virtual private network (VPN), wherein to implement the high-availability VPN the program instructions, when executed on or across one or more computing devices, cause the one or more computing devices to:

assign one or more instances within a provider network to a virtual private gateway that is to be established for a virtual network, wherein the virtual network is implemented within the provider network;

cause one or more virtual network interfaces to be provided to the one or more instances;

cause one or more protocol processing engines to be implemented for exchanging routing information with an external network, external to the provider network;

establish, via the one or more protocol processing engines, a border gateway protocol (BGP) session to exchange routing information for the one or more instances assigned to the virtual private gateway with the external network, wherein the BGP session is established via the one or more virtual network interfaces and a network link established between the provider network and the external network;

establish, using the exchanged routing information, a plurality of VPN tunnels between the external network and the one or more instances assigned to the virtual private gateway via the network link;

establish, via the one or more protocol processing engines, additional respective BGP sessions within the plurality of VPN tunnels to exchange routing information of one or more instances included in the virtual network of the customer with the external network, wherein establishment of the additional respective BGP sessions within the plurality of VPN tunnels provides an encrypted communication channel for the exchange of the routing information to the external network; and enable encrypted communications to flow between the one or more instances included in the virtual network and the external network via the plurality of VPN tunnels implemented via the network link.

18. The one or more non-transitory, computer readable storage media of claim 17, wherein the plurality of VPN tunnels are configured to encrypt network traffic in accordance with:

an IPSec protocol; or an IKE (Internet Key Exchange) protocol.

19. The one or more non-transitory, computer readable storage media of claim 17, wherein prior to establishing the BGP session, the program instructions further cause the one or more processors to:

initiate a protocol processing engine at a first one of the one or more instances; and initiate an additional protocol processing engine.

20. The one or more non-transitory, computer readable storage media of claim 19, wherein the first and second protocol processing engines comprise an IPSec processing module or an IKE (Internet Key Exchange) processing module.

* * * * *